(12) United States Patent
Imamoto et al.

(10) Patent No.: US 10,573,855 B2
(45) Date of Patent: Feb. 25, 2020

(54) POWER STORAGE DEVICE PACKAGING MATERIAL

(71) Applicant: TOPPAN PRINTING CO., LTD., Tokyo (JP)

(72) Inventors: Junya Imamoto, Tokyo (JP); Yu Ogihara, Tokyo (JP); Masayoshi Suzuta, Tokyo (JP)

(73) Assignee: TOPPAN PRINTING CO., LTD., Tokyo (JP)

(*) Notice: Subject to any disclaimer, the term of this patent is extended or adjusted under 35 U.S.C. 154(b) by 0 days.

(21) Appl. No.: 16/221,234

(22) Filed: Dec. 14, 2018

(65) Prior Publication Data

US 2019/0123312 A1   Apr. 25, 2019

Related U.S. Application Data

(63) Continuation of application No. PCT/JP2017/020233, filed on May 31, 2017.

(30) Foreign Application Priority Data

Jun. 15, 2016 (JP) .................................. 2016-118944

(51) Int. Cl.
*H01M 2/02* (2006.01)
*B32B 15/085* (2006.01)
(Continued)

(52) U.S. Cl.
CPC ............. *H01M 2/0287* (2013.01); *B32B 7/12* (2013.01); *B32B 15/085* (2013.01); *B32B 15/20* (2013.01);
(Continued)

(58) Field of Classification Search
CPC ............. H01M 2/0275; H01M 2/0287; H01M 2/0295; H01M 2/02; H01M 10/0525;
(Continued)

(56) References Cited

U.S. PATENT DOCUMENTS

2013/0209868 A1* 8/2013 Suzuta ................ H01M 2/0275
429/176
2016/0059524 A1* 3/2016 Fiebig .................... B32B 27/06
428/216
(Continued)

FOREIGN PATENT DOCUMENTS

EP    2 629 348 A1   8/2013
EP    2 955 770 A1  12/2015
(Continued)

OTHER PUBLICATIONS

Machine translation of Japanese Patent Publication JP 2013222555, published Oct. 28, 2013. (Year: 2013).*
(Continued)

*Primary Examiner* — Miriam Stagg
*Assistant Examiner* — Lilia Nedialkova
(74) *Attorney, Agent, or Firm* — Foley & Lardner LLP

(57) ABSTRACT

A power storage device packaging material has a structure in which at least a substrate layer, a first adhesive layer, a metal foil layer having an anticorrosion treatment layer on either side or both sides thereof, and a sealant layer are laminated in this order. In the packaging material, the sealant layer is formed of a resin composition containing polyolefin, and the sealant layer has at least one crystallization temperature peak in a temperature range of about 100° C. to about 120° C.

14 Claims, 5 Drawing Sheets

(51) Int. Cl.
  *H01G 11/78* (2013.01)
  *B32B 7/12* (2006.01)
  *B32B 15/20* (2006.01)
  *H01M 10/0525* (2010.01)

(52) U.S. Cl.
  CPC ........ *H01G 11/78* (2013.01); *H01M 10/0525* (2013.01); *B32B 2457/10* (2013.01)

(58) Field of Classification Search
  CPC ............ B32B 2457/10; B32B 2274/00; B32B 2307/31; B32B 15/085; B32B 15/20; B32B 2255/20; B32B 2255/24; B32B 2255/28; B32B 2270/00; B32B 27/08; B32B 27/18; B32B 7/12; H01G 11/78; H01G 9/08; Y02E 60/13
  See application file for complete search history.

(56) References Cited

U.S. PATENT DOCUMENTS

2016/0248054 A1  8/2016  Muroi
2018/0016419 A1* 1/2018  Shimizu .................. C08K 3/22

FOREIGN PATENT DOCUMENTS

| | | |
|---|---|---|
| JP | H11-7921 A | 1/1999 |
| JP | H11-86808 A | 3/1999 |
| JP | 2003-288866 A | 10/2003 |
| JP | 2007-273398 A | 10/2007 |
| JP | 2013-222555 A | 10/2013 |
| JP | 2014-238978 A | 12/2014 |
| JP | 2015-144122 A | 8/2015 |
| JP | 2017-076510 A | 4/2017 |
| WO | WO-2015/064699 A1 | 5/2015 |
| WO | WO-2015/152397 A1 | 10/2015 |
| WO | WO-2016/125684 A1 | 8/2016 |

OTHER PUBLICATIONS

Extended European Search Report dated Apr. 3, 2019 in corresponding application No. 17813131.4.
International Search Report with English language translation and Written Opinion issued in International Application No. PCT/JP2017/020233 dated Aug. 29, 2017.

* cited by examiner

LIQUID INJECTED

25V APPLIED

POWER STORAGE DEVICE PACKAGING MATERIAL

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2017/020233, filed on May 31, 2017, which is based upon and claims the benefit of priority to Japanese Patent Application No. 2016-118944, filed on Jun. 15, 2016, the disclosures of which are all hereby incorporated herein by reference in their entireties.

TECHNICAL FIELD

The present invention relates to a power storage device packaging material.

BACKGROUND ART

Known power storage devices include secondary batteries, such as lithium ion batteries, nickel hydride batteries, and lead batteries, and electrochemical capacitors, such as electric double layer capacitors. Due to miniaturization of mobile devices, limitation of installation spaces, or the like, further miniaturization of power storage devices is sought, and thus attention is given to lithium ion batteries for their high energy density.

Metal cans that have been used for packaging materials for lithium ion batteries are being replaced by multilayer films (e.g., configuration including substrate layer/metal foil layer/sealant layer) due to their light weight, high heat dissipation, and low manufacturing cost.

Such a lithium ion battery using a multilayer film as a packaging material uses a configuration in which battery contents are covered with a packaging material including an aluminum foil layer, serving as a metal foil layer, to prevent moisture from penetrating into the battery. Lithium ion batteries using such a configuration are referred to as aluminum laminated lithium ion batteries. In addition to a positive electrode, a negative electrode and a separator, lithium batteries contain an electrolyte or an electrolyte layer formed of a polymer gel impregnated with the electrolyte. This electrolyte is prepared by dissolving a lithium salt in an aprotic solvent having a penetrative ability, such as propylene carbonate, ethylene carbonate, dimethyl carbonate, diethyl carbonate, or ethyl methyl carbonate.

Embossed lithium ion batteries, for example, are known as aluminum laminated lithium ion batteries. Such an embossed lithium ion battery is prepared by forming a recess at part of a packaging material by cold forming, storing battery contents in the recess, folding back other part of the packaging material, and heat-sealing the edge portions. The packaging material configuring such a lithium ion battery is required to exhibit stable sealing performance after being heat-sealed and to be less liable to lose the lamination strength between the aluminum foil layer and the sealant layer due to the electrolyte of the battery contents.

With miniaturization of power storage devices, thickness reduction of the substrate layer, the metal foil layer and the sealant layer of the power storage device packaging materials is underway. However, thickness reduction of the sealant layer poses a problem of deteriorating insulation properties.

Deterioration in insulation properties is induced by various phenomena. Examples of the phenomena include contact between the tab lead and the metal foil layer due to the heat generated during heat sealing or the like, development of cracks in the sealant layer due to forming, bending or the like, fusion of portions which should not be fused during heat sealing (hereinafter called excessive sealing), and damage of the sealant layer due to degassing heat sealing.

In this regard, for example, PTL 1 suggests a packaging material having improved insulation properties and exhibiting more stable sealing performance, heat resistance and formability. This packaging material is provided with a heat-seal layer (sealant layer) that includes a high-melting-point polypropylene layer with a melting point of 150° C. or more and a propylene-ethylene random copolymer layer.

CITATION LIST

[Patent Literature] [PTL 1] JP 2007-273398 A

SUMMARY OF THE INVENTION

Technical Problem

The conventional packaging material as described in the above PTL 1 takes measures against deterioration in insulation properties due to contact between a tab lead and a metal foil layer, or development of cracks in the sealant layer due to folding or the like. However, no measures have been taken against damage of the sealant layer due to excessive sealing or degassing heat sealing, which the inventors of the present invention consider to be the most crucial measure in improving insulation properties, from their experiences of research made thus far.

The inventors of the present invention presume that deterioration in insulation properties stems from development of cracks when stress is exerted on the sealant layer due to the uneven crystal state of the excessively sealed portion. Moreover, since degassing heat sealing is performed with the electrolyte mentioned above being squeezed between surfaces of the packaging material, deterioration in insulation properties is also presumed to stem from foaming of the electrolyte and from damage of the sealant layer due to the foaming. It is considered that the electrolyte enters the cracks or the damaged portions of the sealant layer, and contacts the metal layer, causing the insulation properties to deteriorate.

Furthermore, deterioration in insulation properties, stemming from cracks due to excessive sealing of the sealant layer and damage of the sealant layer due to degassing heat sealing, is likely to be accelerated by thickness reduction of the sealant layer. Therefore, among the measures to be taken for improving insulation properties, measures against deterioration in insulation properties occurring as described above are particularly crucial.

In this regard, the object of the present invention is to provide a power storage device packaging material which sufficiently maintains insulation properties after forming, while satisfying various sealing characteristics including degassing heat-sealing strength even when the sealant layer has a small thickness.

Solution to Problem

The present invention relates to a power storage device packaging material having a laminating structure including at least a substrate layer, a first adhesive layer, a metal foil layer having an anticorrosion treatment layer on one or both sides thereof, and a sealant layer laminated in this order. In the packaging material, the sealant layer is formed of a resin composition containing polyolefin, and has at least one crystallization temperature peak in a temperature range of about 100° C. to about 120° C.

In the present invention, the sealant layer has at least one crystallization temperature peak in the temperature range of about 100° C. to about 120° C. Therefore, even when the resin around the sealed portion melts during heat sealing, the resin crystallizes quickly and excessive sealing is unlikely to occur. Even when excessive sealing occurs, the sealant layer crystallizes quickly, so that the excessively sealed portion is less likely to be unevenly crystallized. Thus, the occurrence of cracks which would cause deterioration in insulation properties is minimized. Conventional sealant layers remain in a molten state when the electrolyte foams during heat sealing, and are damaged by the foaming. However, the sealant layer of the present invention crystallizes before the electrolyte foams, because at least one crystallization temperature peak is within the temperature range of about 100° C. to about 120° C. Therefore, the sealant layer is prevented from being damaged.

Moreover, in the present invention, from the perspective of further improving sealing strength, it is preferable that all the crystallization temperature peaks of the sealant layer are about 120° C. or less.

Herein, the resin composition preferably contains 0.005 mass % to 10 mass % of a crystal nucleating agent relative to the mass of the resin composition. This content of the crystal nucleating agent can cause crystallization more quickly, and can form finer and more uniform spherulites, thereby improving the effect of preventing excessive sealing. Moreover, even when excessive sealing occurs, this content of the crystal nucleating agent allows more rapid crystallization of the excessively sealed portion, and allows formation of much finer and more uniform spherulites. Therefore, non-uniform crystallization is unlikely to develop.

Moreover, since crystallization of the resin composition proceeds more rapidly due to this content of the crystal nucleating agent, damage caused by foaming of the electrolyte during heat sealing can be minimized. Furthermore, formation of the fine and uniform spherulites can minimize the occurrence of minute cracks of the sealant layer (hereinafter referred to as blushing phenomenon) or swelling of the electrolyte due to cold-forming of the packaging material.

In the power storage device packaging material of the present invention, it is preferable that the sealant layer includes two or more layers, and at least one of the two or more layers is made of the resin composition containing the crystal nucleating agent. Of these layers, the layer farthest from the metal foil layer is preferably made of a resin composition containing the crystal nucleating agent. Of these layers, the layer farthest from the metal foil layer corresponds to the innermost layer for the power storage device and is targeted to heat sealing. Thus, this innermost layer containing the crystal nucleating agent can further enhance the effect of preventing excessive sealing.

In the power storage device packaging material of the present invention, the sealant layer includes two or more layers, and a layer closest to the metal foil layer among the two or more layers preferably contains an acid-modified polypropylene, and either a polypropylene having an atactic structure or a propylene-α-olefin copolymer having an atactic structure. Since these resins have adhesive properties, they are particularly suitable for producing power storage device packaging materials by thermal lamination. According to these resins, deterioration in electrolyte lamination strength and insulation properties can be further reduced or prevented.

The sealant layer preferably contains a propylene-ethylene random copolymer as a main component. Compared to the case where the main component is a homopolymer of propylene (homopolypropylene), use of the propylene-ethylene random copolymer as a main component achieves high fluidity due to its lower melting point, and improves sealing strength due to formation of an overflowing portion (so-called polyball) during pressure bonding.

The sealant layer preferably contains an impact resistance modifier. Addition of the impact resistance modifier can impart necessary flexibility, impact resistance, blushing resistance and cold resistance to the power storage device packaging material, while maintaining good insulation properties.

The impact resistance modifier preferably contains a propylene-butene-1 random copolymer which is an elastomer miscible with a propylene-ethylene random copolymer, and an ethylene-butene-1 random copolymer which is an elastomer immiscible with a propylene-ethylene random copolymer. When the impact resistance modifier contains these materials, blushing resistance, impact resistance, and the like can be imparted to the sealant layer, while maintaining electrolyte resistance. Thus, functionality of the power storage device packaging material is further improved.

The power storage device packaging material of the present invention may include a second adhesive layer between the metal foil layer and the sealant layer, and the second adhesive layer preferably contains an acid-modified polyolefin, and at least one curing agent selected from the group consisting of a polyfunctional isocyanate compound, a glycidyl compound, a compound having a carboxy group, and a compound having an oxazoline group. The constitution provided with the second adhesive layer is particularly suitable for producing power storage device packaging materials by dry lamination. When the second adhesive layer contains the resin mentioned above, deterioration in electrolyte lamination strength and insulation properties is further reduced or prevented.

The anticorrosion treatment layer preferably contains a cerium oxide, 1 part by mass to 100 parts by mass of phosphoric acid or phosphate relative to 100 parts by mass of the cerium oxide, and a cationic polymer. When the anticorrosion treatment layer contains these materials, deterioration in electrolyte lamination strength and insulation properties is further reduced or prevented.

The anticorrosion treatment layer is preferably formed by applying chemical conversion treatment to a metal foil layer. Moreover, the anticorrosion treatment layer is preferably formed by applying chemical conversion treatment to a metal foil layer, and preferably contains a cationic polymer.

Advantageous Effects of the Invention

The present invention provides a power storage device packaging material capable of sufficiently maintaining insulation properties after forming, while satisfying various sealing characteristics including degassing heat-sealing strength even when the sealant layer has a small thickness.

DESCRIPTION OF REPRESENTATIVE EMBODIMENTS

Figure 1:
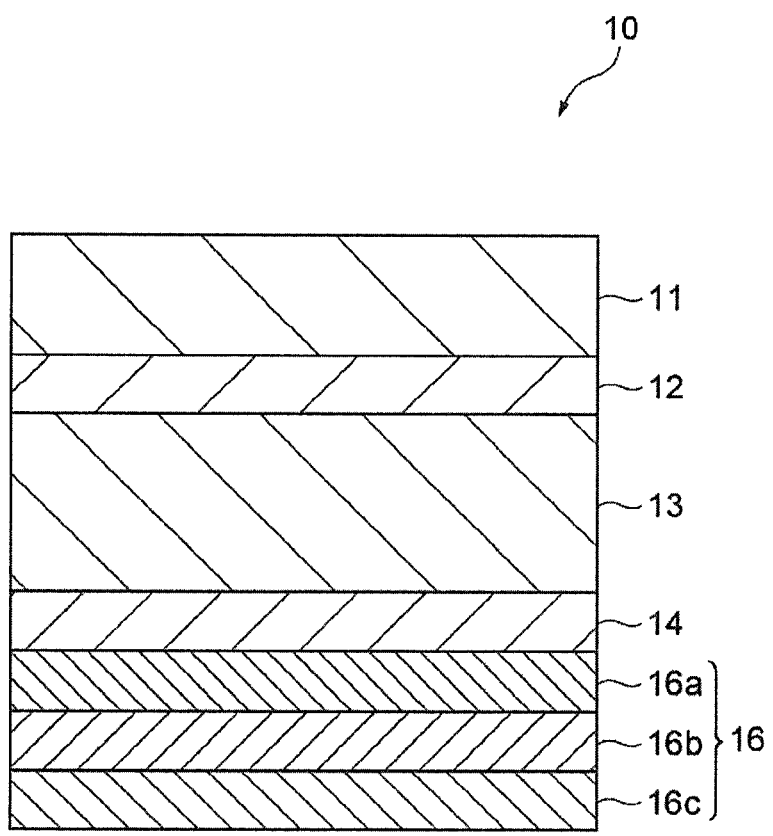
FIG. 1 is a schematic cross-sectional view illustrating a power storage device packaging material according to an embodiment of the present invention.

With reference to the drawings, preferred embodiments of the present invention will be described in detail. In the drawings, the same or corresponding components are given the same reference numerals to omit duplicate description. Moreover, dimensional ratios of the drawings are not limited to the ratios shown in the drawings. With reference to the drawings, embodiments of the present invention will be described in detail. It is to be understood that the present invention is not limited to the following embodiments, which are intended to be representative of the present invention. The representative embodiments described below are merely examples of the present invention, and the design thereof could be appropriately changed by one skilled in the art. Incidentally, unless there is a reason for the sake of convenience, the same reference signs will be used for identical components, and redundant explanations will be omitted. It will be noted that in the drawings, like or corresponding parts are designated by like reference numerals and redundant illustrations therefor are omitted. The dimensional ratios in the drawings should not be construed as limited to those ratios shown therein.

[Power Storage Device Packaging Material]

FIG. 1 is a cross-sectional view schematically showing an embodiment of a power storage device packaging material of the present embodiment. As shown in FIG. 1, the packaging material (power storage device packaging material) 10 of the present embodiment is a laminate including, in the following order, a substrate layer 11, a first adhesive layer 12 formed on a surface of the substrate layer 11, a metal foil layer 13 formed on a surface of the first adhesive layer 12 on a side opposite to that facing the substrate layer 11, an anticorrosion treatment layer 14 formed on a surface of the metal foil layer 13 on a side opposite to that facing the first adhesive layer 12, and a sealant layer 16 formed on a surface of the anticorrosion treatment layer 14 on a side opposite to that facing the metal foil layer 13. In the packaging material 10, the substrate layer 11 is the outermost layer and the sealant layer 16 is the innermost layer. In other words, the packaging material 10 is used with the substrate layer 11 being on the outside of the power storage device and the sealant layer 16 being on the inside of the power storage device. Each layer will be described.

<Substrate Layer 11>

The substrate layer 11 is provided for the purpose of imparting heat resistance in the sealing step at the time of producing the power storage device, and taking measures against pinholes that would develop during processing or distribution. A resin layer having insulation properties is preferably used for the substrate layer 11. Examples of the resin layer that can be used include stretched or unstretched films such as a polyester film, a polyamide film, and a polypropylene film. These films may be used singly as a monolayer, or by laminating two or more as a multilayer. A coextruded multilayer stretched film may also be used obtained by coextruding a polyethylene terephthalate film (PET) and a nylon film (Ny) using an adhesive resin, and thereafter applying stretching treatment.

The substrate layer 11 preferably has a thickness in the range of 6 μm to 40 μm, and more preferably 10 μm to 25 μm. When the thickness of the substrate layer 11 is 6 μm or more, there is a tendency to improve pinhole resistance and insulation properties of the power storage device packaging material 10. The substrate layer 11 having a thickness of 40 μm or less may even more improve deep drawing formability of the power storage device packaging material 10.

<First Adhesive Layer 12>

The first adhesive layer 12 bonds between the substrate layer 11 and the metal foil layer 13. For example, the material used for forming the first adhesive layer 12 may be specifically a polyurethane resin prepared by reacting a bifunctional or higher functional isocyanate compound with a main resin such as a polyester polyol, polyether polyol, acrylic polyol, carbonate polyol, or the like.

These various polyols can be used alone or in combination of two or more, according to the functions and performance sought in the packaging material.

Moreover, other various additives and stabilizers may be added to the polyurethane resin mentioned above depending on the performance required of the adhesive.

The thickness of the first adhesive layer 12 is not particularly limited, but from the perspective of obtaining desired adhesive strength, conformability, processability and the like, for example, the thickness is preferably 1 μm to 10 μm, and more preferably 3 μm to 7 μm.

<Metal Foil Layer 13>

The metal foil layer 13 has water vapor barrier properties to prevent moisture from infiltrating into the power storage device. Further, the metal foil layer 13 has ductility for deep drawing. Metal foil layers 13 that can be used include various metal foils such as aluminum, stainless steel, and the like. In terms of mass (specific gravity), moisture resistance, processability and cost, aluminum foil is preferable.

The aluminum foil may be a soft aluminum foil, particularly one subjected to an annealing treatment. It is more preferable to use an aluminum foil containing iron for the purpose of further imparting pinhole resistance and ductility at the time of forming. The iron content in the aluminum foil is preferably in the range of 0.1 mass % to 9.0 mass % relative to 100 mass % of aluminum foil, and more preferably in the range of 0.5 mass % to 2.0 mass %. When the content of iron is 0.1 mass % or more, a packaging material 10 having much better pinhole resistance and ductility can be obtained. When the content of iron is 9.0 mass % or less, a packaging material 10 having much better flexibility can be obtained.

The thickness of the metal foil layer 13 is not particularly limited, but is preferably in the range of 9 μm to 200 μm, and more preferably 15 μm to 100 μm, in terms of barrier properties, pinhole resistance and processability.

When using an aluminum foil in the metal foil layer 13, an untreated aluminum foil may be used as the aluminum foil, but an aluminum foil subjected to a degreasing treatment is preferably used from the viewpoint of imparting electrolyte resistance.

For example, the hydrothermal modification treatment may be a boehmite treatment of immersion-treating an aluminum foil in boiling water to which triethanolamine has been added.

For example, the anodic oxidation treatment may be an alumite treatment.

The chemical conversion treatment may be of an immersion type or a coating type. The immersion type chemical conversion treatment may be, for example, chromate treatment, zirconium treatment, titanium treatment, vanadium treatment, molybdenum treatment, calcium phosphate treatment, strontium hydroxide treatment, cerium treatment, ruthenium treatment, or various chemical conversion treatments of mixed phases thereof. The coating type chemical conversion treatment may be a method of applying a coating agent having a corrosion prevention performance onto the metal foil layer 13.

Of these anticorrosion treatments, if at least part of the anticorrosion treatment layer is formed by any of hydrothermal modification treatment, anodization and chemical conversion treatment, degreasing treatment is preferably performed in advance. If a degreased metal foil is used as the metal foil layer 13, the degreasing treatment is not necessary in forming the anticorrosion treatment layer 14.

The coating agent used for the coating type chemical conversion treatment preferably contains trivalent chromium. The coating agent may contain at least one polymer selected from the group consisting of a cationic polymer and an anionic polymer to be described later.

Of the treatments mentioned above, the hydrothermal modification treatment and the anodic oxidation treatment, in particular, dissolve the surface of an aluminum foil with a treating agent and form an aluminum compound having good corrosion resistance (such as boehmite or alumite). Thus, these treatments, which form a co-continuous structure extending from the metal foil layer 13 using the aluminum foil to the anticorrosion treatment layer 14, are encompassed by the definition of the chemical conversion treatment. However, the anticorrosion treatment layer 14 can be formed only by a pure coating method that is not encompassed by the definition of the chemical conversion treatment, as will be described later. For example, this coating method may be a method using a rare-earth-based oxide sol, such as cerium oxide with a mean particle size of 100 nm or less exhibiting an anticorrosion effect (inhibitor effect) for aluminum, as a material preferable in terms of environmental aspects. Use of this method makes it possible to impart an anticorrosion effect to a metal foil such as an aluminum foil even when using an ordinary coating method.

Examples of the rare-earth-based oxide sol include sols using various solvents such as an aqueous solvent, an alcohol-based solvent, a hydrocarbon-based solvent, a ketone-based solvent, an ester-based solvent, an ether-based solvent, and the like. Of these sols, an aqueous sol is preferable.

To stabilize a dispersion, the rare-earth-based oxide sol may contain, as a dispersion stabilizer, an inorganic acid such as nitric acid, hydrochloric acid, phosphoric acid, or the like or a salt thereof, or an organic acid such as acetic acid, malic acid, ascorbic acid, lactic acid, or the like. Of these dispersion stabilizers, phosphoric acid, in particular, is expected to impart the packaging material 10 with features of (1) stabilizing dispersion of the sol, (2) improving adhesion to the metal foil layer 13 making use of an aluminum chelate ability of phosphoric acid, (3) imparting electrolyte resistance by trapping aluminum ions eluted under the influence of hydrofluoric acid (passive state formation), (4) improving cohesive force of the anticorrosion treatment layer 14 (oxide layer) by readily inducing dehydration condensation of phosphoric acid even at low temperature, and the like.

The phosphoric acid mentioned above or a salt thereof may be orthophosphoric acid, pyrophosphoric acid, metaphosphoric acid, or an alkali metal salt, or an ammonium salt thereof. Of these phosphoric acids or salts thereof, condensed phosphoric acid such as trimetaphosphoric acid, tetrametaphosphoric acid, hexametaphosphoric acid, or ultrametaphosphoric acid, or an alkali metal salt, or an ammonium salt thereof is preferable for functional development in the packaging material 10. Considering the dry film forming properties (drying capacity and heat quantity) when forming the anticorrosion treatment layer 14 made of a rare-earth oxide by various coating methods using the rare-earth oxide sol mentioned above, a sodium salt is more preferable from the perspective of easily exhibiting dehydration condensation at low temperature. The phosphate salt is preferably a water-soluble salt.

The content of phosphoric acid (or a salt thereof) is preferably 1 part by mass to 100 parts by mass relative to 100 parts by mass of the rare-earth oxide. If the content of the phosphoric acid or a salt thereof is not less than 1 part by mass relative to 100 parts by mass of the rare-earth oxide, the rare-earth oxide sol becomes more stable and the function of the packaging material 10 becomes much better. The content of the phosphoric acid or a salt thereof is more preferably not less than 5 parts by mass relative to 100 parts by mass of the rare-earth oxide. If the content of the phosphoric acid or a salt thereof is not more than 100 parts by mass relative to 100 parts by mass of the rare-earth oxide, the function of the rare-earth oxide sol is enhanced, so that better performance is exhibited for preventing permeation of the electrolyte. The content of the phosphoric acid or a salt thereof is preferably not more than 50 parts by mass relative to 100 parts by mass of the rare-earth oxide, and more preferably not more than 20 parts by mass.

Since the anticorrosion treatment layer 14 formed of the rare-earth oxide sol is an aggregate of inorganic particles, the cohesive force of the layer itself may be lowered even after being dry-cured. Therefore, the anticorrosion treatment layer 14 in this case is preferably compounded with an anionic polymer or a cationic polymer mentioned below to supplement the cohesive force.

The anionic polymer may be a polymer having a carboxy group. For example, poly (meth)acrylic acid (or a salt thereof), or a copolymer containing poly (meth)acrylic acid as a main component can be considered. The copolymerization component of the copolymer includes an alkyl (meth)acrylate monomer (having a methyl group, an ethyl group, an n-propyl group, an i-propyl group, an n-butyl group, an i-butyl group, a t-butyl group, a 2-ethylhexyl group, or a cyclohexyl group as an alkyl group); an amide group-containing monomer, such as (meth)acrylamide, N-alkyl (meth)acrylamide, or N,N-dialkyl (meth)acrylamide (having a methyl group, an ethyl group, an n-propyl group, an i-propyl group, an n-butyl group, an i-butyl group, a t-butyl group, a 2-ethylhexyl group, a cyclohexyl group, etc. as an alkyl group), N-alkoxy (meth)acrylamide, or N,N-dialkoxy (meth)acrylamide (having a methoxy group, an ethoxy group, a butoxy group, an isobutoxy group, etc. as an alkoxy group), N-methylol (meth)acrylamide, or N-phenyl (meth)acrylamide; a hydroxyl group-containing monomer, such as 2-hydroxyethyl (meth)acrylate, or 2-hydroxypropyl (meth)acrylate; a glycidyl group-containing monomer, such as glycidyl (meth)acrylate, or allyl glycidyl ether; a silane-containing monomer, such as (meth)acryloxypropyltrimethoxysilane or (meth)acryloxypropyltriethoxysilane; or an isocyanate group-containing monomer, such as (meth)acryloxypropyl isocyanate.

These anionic polymers improve the stability of the anticorrosion treatment layer 14 (oxide layer) obtained using the rare-earth oxide sol. The improvement is achieved by the effect of protecting a hard and brittle oxide layer with the acrylic resin component, and the effect of capturing ion contamination (particularly sodium ions) derived from the phosphoric acid contained in the rare-earth oxide sol (cation catcher). That is, if the anticorrosion treatment layer 14 obtained using the rare-earth oxide sol contains alkali metal ions such as sodium ions or alkaline earth metal ions in particular, the anticorrosion treatment layer 14 is likely to be deteriorated starting from the site containing the ions. Therefore, the sodium ion or the like contained in the rare-earth oxide sol is fixed with the anionic polymer to improve the durability of the anticorrosion treatment layer 14.

The anticorrosion treatment layer 14 that is the combination of the anionic polymer and the rare-earth oxide sol has anticorrosion performance equivalent to that of the anticorrosion treatment layer 14 formed by applying chromate treatment to an aluminum foil. The anionic polymer preferably has a structure where a polyanionic polymer which is essentially water-soluble is crosslinked. The crosslinking agent used for forming this structure may be a compound having, for example, an isocyanate group, a glycidyl group, a carboxyl group or an oxazoline group.

Examples of the compound having an isocyanate group include a diisocyanate such as tolylene diisocyanate, xylylene diisocyanate or a hydrogenated product thereof, hexamethylene diisocyanate, 4,4'-diphenylmethane diisocyanate or a hydrogenated product thereof, isophorone diisocyanate; or a polyisocyanate such as an adduct form obtained by reacting these isocyanates with a polyhydric alcohol, such as trimethylolpropane, a biuret obtained by reacting the isocyanates with water, or an isocyanurate as a trimer; and a blocked polyisocyanate obtained by blocking these polyisocyanates with an alcohol, a lactam, an oxime, or the like.

Examples of the compound having a glycidyl group include an epoxy compound obtained by permitting epichlorohydrin to act on a glycol, such as ethylene glycol, diethylene glycol, triethylene glycol, polyethylene glycol, propylene glycol, dipropylene glycol, tripropylene glycol, polypropylene glycol, 1,4-butanediol, 1,6-hexanediol, or neopentyl glycol; and an epoxy compound obtained by permitting epichlorohydrin to act on a polyhydric alcohol, such as glycerin, polyglycerin, trimethylolpropane, pentaerythritol, or sorbitol, or an epoxy compound obtained by permitting epichlorohydrin to act on a dicarboxylic acid, such as phthalic acid, terephthalic acid, oxalic acid, or adipic acid.

Examples of the compound having a carboxyl group includes various aliphatic or aromatic dicarboxylic acids and the like. Also, poly(meth)acrylic acid or an alkali (earth) metal salt of poly(meth)acrylic acid may be used.

Examples of the compound having an oxazoline group include a low molecular weight compound having two or more oxazoline units, or when using a polymerizable monomer such as isopropenyloxazoline, a compound obtained by copolymerizing with an acrylic monomer such as (meth) acrylic acid, (meth)acrylic alkyl ester, and hydroxyalkyl (meth)acrylate.

Similarly to a silane coupling agent, the anionic polymer may have a siloxane bond at a crosslinking point as a result of permitting the functional group to selectively react with an amine. In this case, γ-glycidoxypropyltrimethoxysilane, γ-glycidoxypropyltriethoxysilane, β-(3,4-epoxycyclohexyl) ethyltrimethoxysilane, γ-chloropropylmethoxysilane, vinyl- trichlorosilane, γ-mercaptopropyltrimethoxysilane, γ-aminopropyltriethoxysilane, N-β(aminoethyl)-γ-aminopropyltrimethoxysilane, or γ-isocyanatopropyltriethoxysilane, or the like may be used. Of these materials, an epoxy silane, aminosilane or isocyanate silane is preferable in terms of reactivity with an anionic polymer or a copolymer thereof in particular.

The ratio of these crosslinking agents to the anionic polymer is preferably in the range of 1 part by mass to 50 parts by mass, and more preferably 10 parts by mass to 20 parts by mass, relative to 100 parts by mass of the anionic polymer. When the ratio of the crosslinking agent is not less than 1 part by mass relative to 100 parts by mass of the anionic polymer, a crosslinked structure is likely to be sufficiently formed. When the ratio of the crosslinking agent is not more than 50 parts by mass relative to 100 parts by mass of the anionic polymer, pot life of the coating solution improves.

The method used for crosslinking the anionic polymer may be a method of forming an ionic crosslinkage using titanium, zirconium compound or the like, and is not limited to the use of the crosslinking agents mentioned above.

The cationic polymer may be a polymer having an amine, including polyethyleneimine, an ionic polymer complex composed of a polymer having polyethyleneimine and a carboxylic acid, a primary amine graft acrylic resin obtained by grafting a primary amine to an acrylic backbone, polyallylamine or derivatives thereof, and aminophenol.

The cationic polymer is preferably used in combination with a crosslinking agent having a functional group, such as a carboxy group or a glycidyl group, capable of reacting with an amine/imine. The crosslinking agent to be used in combination with the cationic polymer may be a polymer having carboxylic acid that forms an ionic polymer complex with polyethyleneimine. Examples of such a crosslinking agent include polycarboxylic acid (salt) such as polyacrylic acid or ionic salts thereof, copolymer having a comonomer introduced thereto, polysaccharides having a carboxy group such as carboxymethyl cellulose or ionic salts thereof, or the like. Examples of the polyallylamine include homopolymers or copolymers of allylamine, allylamine amide sulfate, diallylamine, or dimethylallylamine, and the like. These amines may be free amines or may be ones stabilized with acetic acid or hydrochloric acid. Maleic acid, sulfur dioxide or the like may be used as a copolymer component. Furthermore, a primary amine may be used after being partially methoxylated to impart crosslinking properties thereto, or aminophenol may also be used. In particular, allylamine or derivatives thereof are preferable.

In the present embodiment, a cationic polymer is also mentioned as a component constituting the anticorrosion treatment layer 14. The reason for this is that, as a result of detailed studies using various compounds to find a way to impart electrolyte resistance and hydrofluoric acid resistance required of a power storage device packaging material, it has been found that the cationic polymer in itself is also a compound capable of imparting electrolyte resistance and hydrofluoric acid resistance to the package. This is inferred to be the result of inhibiting damage to the aluminum foil by capturing fluorine ions with cationic groups (anion catcher).

The cationic polymer is a more preferable material from the perspective of improving adhesiveness. Since the cationic polymer is water-soluble similarly to the anionic polymer mentioned above, it is more preferable to impart water resistance by permitting it to form a crosslinked structure. The crosslinking agent that can be used for forming a crosslinked structure in the cationic polymer may include ones mentioned in the section on the anionic polymer. When a rare-earth oxide sol is used as the anticorrosion treatment layer 14, a cationic polymer may be used as a protective layer, instead of using the anionic polymer mentioned above.

The anticorrosion treatment layer is a chemical conversion treatment layer obtained through chemical conversion treatment represented by a chromate treatment, and is permitted to form a gradient structure relative to the aluminum foil. To form the gradient structure, the chemical conversion treatment layer is formed on the aluminum foil by treating the aluminum foil using, in particular, a chemical conversion treating agent containing hydrofluoric acid, hydrochloric acid, nitric acid, sulfuric acid, or a salt thereof, followed by reaction with a chromium- or non-chromium-based compound. However, the chemical conversion treatment, which uses an acid as a chemical conversion treating agent, causes deterioration of the working environment and corrosion of the coating device. In this regard, the coating-type anticorrosion treatment layer 14 mentioned above does not need to form a gradient structure relative to the metal foil layer 13 of an aluminum foil, unlike the anticorrosion treatment layer obtained through the chemical conversion treatment represented by a chromate treatment. Therefore, the properties of the coating agent are not restricted in terms of acidity, alkalinity, neutrality and the like, and a good working environment can be achieved. The coating-type anticorrosion treatment layer 14 is preferable since chromate treatment using a chromium compound requires alternatives in terms of environmental health.

From the above description, combinations of the above coating type anticorrosion treatments may be (1) rare earth oxide sol alone, (2) anionic polymer alone, (3) cationic polymer alone, (4) rare earth oxide sol+anionic polymer (laminated composite), (5) rare earth oxide sol+cationic polymer (laminated composite), (6) (rare earth oxide sol+anionic polymer: laminated composite)/cationic polymer (multilayer), (7) (rare earth oxide sol+cationic polymer: laminated composite)/anionic polymer (multilayer), and the like. Of these combinations, (1) and (4) to (7) are preferable, and (4) to (7) are more preferable. However, the present embodiment should not limit combinations to ones mentioned above. An example of selecting the anticorrosion treatment is as follows. Specifically, when the sealant adhesive layer is formed of a modified polyolefin resin, the cationic polymer is designed to be provided on the surface contacting the sealant adhesive layer (e.g., configurations (5) and (6)) since the cationic polymer is a material even more preferable in terms of good adhesion with a modified polyolefin resin that will be mentioned below regarding the sealant adhesive layer (adhesive resin layer or second adhesive layer).

The anticorrosion treatment layer 14 is not limited to the layer mentioned above. For example, the anticorrosion treatment layer 14 may be formed using a treating agent which is obtained by adding phosphoric acid and a chromium compound to a resin binder (such as aminophenol) as in a coating-type chromate based on known art. When this treating agent is used, the resultant layer will have both a corrosion-preventing function and adhesion. Although it is necessary to consider stability of a coating solution, a coating agent may be prepared in advance by integrating a rare-earth oxide sol with a polycationic polymer or a polyanionic polymer, and using this coating agent, the anticorrosion treatment layer 14 may be formed being imparted with both the corrosion preventing function and adhesion.

Regardless of having a multilayer structure or a monolayer structure, the mass per unit area of the anticorrosion treatment layer 14 is preferably 0.005 g/m$^2$ to 0.200 g/m$^2$, and more preferably 0.010 g/m$^2$ to 0.100 g/m$^2$. When the mass per unit area is 0.005 g/m$^2$ or more, a corrosion prevention function can be readily imparted to the metal foil layer 13. Even if the mass per unit area exceeds 0.200 g/m$^2$, there is little change in the corrosion preventing function. In contrast, when a rare earth oxide sol is used, a thick coating may cause insufficient thermal curing during drying and decrease the cohesive force. It should be noted that the thickness of the anticorrosion treatment layer 14 can be calculated from its specific gravity.

<Sealant Layer 16>

The sealant layer 16 imparts sealing properties to the packaging material 10 by being heat-sealed, and is formed of a resin composition containing polyolefin.

The sealant layer 16 may be a monolayer, but may, more preferably, be constituted of a plurality of layers such as two layers or three layers. As shown in FIG. 1, a three-layer constitution, for example, is one that includes a layer closest to the metal foil layer 13 (hereinafter referred to as outermost layer 16a), a layer laminated on the outermost layer 16a (hereinafter referred to as intermediate layer 16b) and a layer laminated on the intermediate layer 16b (hereinafter referred to as innermost layer 16c). The term "innermost layer" is not named from the position of being "inner" or "outer" of a laminated structure of the packaging material 10, but refers to a layer that is heat-sealed being located on the inside when the packaging material 10 is formed for a power storage device. Each of the layers will be described.

[Outermost Layer 16a]

The outermost layer 16a plays a role of bonding another layer constituting the sealant layer 16 to the metal foil layer 13. The outermost layer 16a is constituted to contain an adhesive resin composition as a main component and, if necessary, an additive component. The adhesive resin composition is not particularly limited, but may preferably contain a modified polyolefin resin (a) component and a macrophase-separated thermoplastic elastomer (b) component. The additive component preferably contains polypropylene having an atactic structure or a propylene-α-olefin copolymer (c) having an atactic structure. Each component will be described below.

(Modified Polyolefin Resin (a))

The modified polyolefin resin (a) is preferably a resin obtained by graft-modifying an unsaturated carboxylic acid derivative component derived from any one of an unsaturated carboxylic acid, acid anhydride of an unsaturated carboxylic acid, and ester of an unsaturated carboxylic acid to a polyolefin resin. The acid-modified polyolefin resin is preferably an acid-modified polyolefin.

Examples of the polyolefin resin include low density polyethylene, medium density polyethylene, high density polyethylene, ethylene-α-olefin copolymers, homo-, block- or random-polypropylene, and propylene-α-olefin copolymer. Of these resins, a polypropylene-based resin is preferable.

The compound used for graft-modifying these polyolefin resins may be an unsaturated carboxylic acid derivative component derived from any one of an unsaturated carboxylic acid, acid anhydride of an unsaturated carboxylic acid, and ester of an unsaturated carboxylic.

Specifically, examples of the unsaturated carboxylic acid include acrylic acid, methacrylic acid, maleic acid, fumaric acid, itaconic acid, citraconic acid, tetrahydrophthalic acid, bicyclo[2,2,1]hept-2-ene-5,6-dicarboxylic acid, and the like.

Examples of the acid anhydride of the unsaturated carboxylic acid include maleic anhydride, itaconic anhydride, citraconic anhydride, tetrahydrophthalic anhydride, bicyclo[2,2,1]hept-2-ene-5,6-dicarboxylic acid anhydride, and the like.

Examples of the esters of unsaturated carboxylic acid include methyl acrylate, methyl methacrylate, ethyl methacrylate, butyl methacrylate, dimethyl maleate, monomethyl maleate, diethyl fumarate, dimethyl itaconate, diethyl citraconate, dimethyl tetrahydrophthalic anhydride, bicyclo[2,2,1]hept-2-ene-5,6-dimethyl dicarboxylate, and the like.

The modified polyolefin resin (a) can be prepared by graft polymerization (graft modification) of 0.2 to 100 parts by mass of the unsaturated carboxylic acid derivative component mentioned above relative to 100 parts by mass of a base polyolefin resin in the presence of a radical initiator. The reaction temperature of the graft modification is preferably 50° C. to 250° C., and more preferably 60° C. to 200° C. The reaction time is appropriately set depending on the production method; however, in the case of a melt graft polymerization using a biaxial extruder, for example, the reaction time is preferably within the residence time of the extruder, specifically 2 min to 30 min, and more preferably 5 min to 10 min. Graft modification can be carried out under normal pressure or pressurized conditions.

The radical initiator used for graft modification may be an organic peroxide such as alkyl peroxide, aryl peroxide, acyl peroxide, ketone peroxide, peroxy ketal, peroxy carbonate, peroxy ester, or hydroperoxide.

These organic peroxides can be appropriately selected and used depending on the conditions of the reaction temperature and the reaction time mentioned above. For example, in the case of melt graft polymerization using a biaxial extruder, alkyl peroxide, peroxy ketal, or peroxy ester is preferable, and specifically di-t-butyl peroxide, 2,5-dimethyl-2,5-di-t-butyl peroxy-hexyne-3, dicumyl peroxide, or the like is preferable.

The modified polyolefin resin (a) is preferably a polyolefin resin modified with maleic anhydride. For example, Admer manufactured by Mitsui Chemicals, Inc. Modic manufactured by Mitsubishi Chemical Corporation, or the like is suitable. Such a modified polyolefin resin (a) component excels at reactivity with various metals and polymers having various functional groups, and thus can impart adhesion to the outermost layer 16a, making use of the reactivity, and can accordingly improve electrolyte resistance.

(Macrophase-Separated Thermoplastic Elastomer (b))

The macrophase-separated thermoplastic elastomer (b) forms a macrophase-separated structure having a dispersed phase size in a range in excess of 200 nm to 50 μm or less, relative to the modified polyolefin resin (a).

By the adhesive resin composition containing a macrophase-separated thermoplastic elastomer (b) component, the residual stress can be released, which is generated during lamination of the modified polyolefin resin (a) component and the like that can be the main component of forming the outermost layer 16a, and viscoelastic adhesion can be imparted to the outermost layer 16a. Therefore, adhesion of the outermost layer 16a is further improved, and a packaging material 10 having much better electrolyte resistance can be obtained.

The macrophase-separated thermoplastic elastomer (b) is present in the form of a sea-island structure on the modified polyolefin resin (a), but if the dispersed phase size is 200 nm or less, it becomes difficult to impart an improvement in viscoelastic adhesion to the first sealant layer 16a. If the dispersed phase size is in excess of 50 μm, since the modified polyolefin resin (a) is substantially immiscible with the macrophase-separated thermoplastic elastomer (b), the lamination suitability (processability) decreases considerably and it becomes easy for the material physical strength of the outermost layer 16a to deteriorate. Therefore, the dispersed phase size is preferably in the range of 500 nm to 10 μm.

The macrophase-separated thermoplastic elastomer (b) may be, for example, a polyolefin-based thermoplastic elastomer obtained by copolymerizing ethylene and/or propylene with an α-olefin selected from 1-butene, 1-pentene, 1-hexene, 1-octene and 4-methyl-1-pentene.

Further, commercially available products can be used as the macrophase-separated thermoplastic elastomer (b) component. For example, Tafine manufactured by Mitsui Chemicals Inc., Zelas manufactured by Mitsubishi Chemical Corp., Catalloy manufactured by Montell Co, or the like is suitable.

In the outermost layer 16a, the content of macrophase-separated thermoplastic elastomer (b) component relative to the modified polyolefin resin (a) component in the adhesive resin composition is preferably 1 to 40 parts by mass with respect to 100 parts by mass of the modified polyolefin resin (a) component, and more preferably 5 to 30 parts by mass. If the content of the macrophase-separated thermoplastic elastomer (b) component is less than 1 part by mass, the improvement of the adhesion of the adhesive resin layer cannot be anticipated. If the content of the macrophase-separated thermoplastic elastomer (b) component exceeds 40 parts by mass, processability is likely to be drastically lowered because miscibility is inherently low between the modified polyolefin resin (a) component and the macrophase-separated thermoplastic elastomer (b) component. Since the macrophase-separated thermoplastic elastomer (b) component is not a resin exhibiting adhesion, adhesion of the outermost layer 16a to other layers, such as other layer constituting the sealant layer 16 and the anticorrosion treatment layer 14, is likely to deteriorate.

(Polypropylene Having Atactic Structure or Propylene-α-Olefin Copolymer (c) Having Atactic Structure)

It is preferable that the outermost layer 16a contains polypropylene having an atactic structure or a propylene-α-olefin copolymer having an atactic structure (hereinafter simply referred to as component (c)) as an additive component. The component (c) herein is a perfect amorphous resin component.

Hereinafter, a description will be given of the effect of adding the additive component (c) to the adhesive resin composition as a main component, in the outermost layer 16a.

In a molten state of the outermost layer 16a, the component (c) is miscible with the modified polyolefin resin (a) component in the adhesive resin composition, but is discharged from the crystal during crystallization accompanying cooling, and uniformly dispersed around the spherulite. As a result, the component (c) does not interfere with the degree of crystallization of the modified polyolefin resin (a) component in the adhesive resin composition as a main component. By adding the component (c) to the outermost layer 16a, the concentration of the modified polyolefin resin (a) component is diluted by the component (c) to minimize crystal growth, thereby reducing the crystal size (spherulite size) of the adhesive component (i.e., the modified polyolefin resin (a) component) of the base resin. Moreover, the component (c) discharged from the crystal is uniformly dispersed around the micro-spherulites of the modified polyolefin resin (a) component. Due to the effect of the component (c) as described above, the blushing phenomenon can be suppressed.

The ratio of the component (c) in the outermost layer 16a preferably has a lower limit of 2.5 mass %, and more preferably 5 mass % or more. However, the upper limit is preferably 60 mass %. If the ratio of the component (c) in the outermost layer 16a is less than 2.5 mass %, the effect exerted by adding the component (c) as described above cannot be sufficiently obtained. On the other hand, if in excess of 60 mass % is used (i.e., if the ratio of the adhesive resin composition is less than 40 mass %), the adhesion of the outermost layer 16a to other layers such as the sealant layer 16 and the anticorrosion treatment layer 14 tends to deteriorate.

(Propylene-α-Olefin Copolymer (d) Having Isotactic Structure)

In addition to the component (c) mentioned above, the outermost layer 16a may preferably further contain a propylene-α-olefin copolymer having an isotactic structure (hereinafter simply referred to as component (d)) as an additive component.

The component (d) acts as a miscible rubber component, when the modified polyolefin resin (a) in the adhesive resin component as the main component of the outermost layer 16a is specifically a polypropylene-based adhesive resin.

That is, with further addition of the component (d) as an additive component to the adhesive resin component as the main component of the outermost layer 16a, flexibility for alleviating stress can be imparted to the layer. Therefore, heat-sealing strength (in particular, electrolyte resistance) and degassing sealing strength are improved, and deterioration in electrolyte lamination strength is reduced or prevented. Further, the blushing phenomenon and bending insulation resistance can be further improved by combining the components (c) and (d) as additive components.

The ratio of the additive components (i.e., the total of the component (c) and the component (d)) in the outermost layer 16a is preferably 5 mass % to 60 mass %. If the ratio of the additive components in the outermost layer 16a is less than 5 mass % (i.e., if the ratio of the adhesive resin composition is in excess of 95 mass %), the effect of adding the additives as described above is not necessarily sufficiently obtained. On the other hand, if in excess of 60 mass % is used (i.e., if the ratio of the adhesive resin composition is less than 40 mass %), the adhesion of the outermost layer 16a to other layers such as the sealant layer 16 and the anticorrosion treatment layer 14 tends to deteriorate.

The method of analyzing the component (c) which is an additive component in the outermost layer 16a, may, for example, be quantification through stereoregularity assessment which is based on nuclear magnetic resonance spectroscopy (NMR).

The component (d) can be analyzed using Fourier transform infrared spectroscopy (FT-IR), and the formulation ratio can be verified by creating a calibration curve using an absorber attributed to the branching of α-olefin, and an absorber attributed to the specific absorber of the modified polyolefin resin (a).

Besides the adhesive resin composition (i.e., the modified polyolefin resin (a) component and the macrophase-separated thermoplastic elastomer (b) component) and the additive component (i.e., the components (c) and (d)), the outermost layer 16a may contain various additives such as a flame retardant, slip agent, antiblocking agent, antioxidant, light stabilizer, tackifier, and the like, as required.

The thickness of the outermost layer 16a is not specifically limited, but is preferably the same or less than that of the sealant layer 16 from the viewpoints of stress relaxation, and moisture/electrolyte permeation.

(Intermediate Layer 16b)

The intermediate layer 16b can have the same constitution as the innermost layer 16c described below.

(Innermost Layer 16c)

The innermost layer 16c is made of a resin composition containing a propylene-ethylene random copolymer (A) as a main component. This resin composition preferably contains a polyolefin-based elastomer (B) having butene-1 as a comonomer and other elastomers (as impact resistance modifiers). These components will be described.

(Propylene-Ethylene Random Copolymer (A))

The propylene-ethylene random copolymer (A) excels at heat sealing properties at low temperature as compared to the propylene-ethylene block copolymer and the propylene homopolymer, and improves sealing properties against the electrolyte. If the the resin composition contains the polyolefin-based elastomer (B), the occurrence of excessive sealing is minimized.

In the propylene-ethylene random copolymer (A), the content of ethylene is preferably in the range of 0.1 mass % to 10 mass %, more preferably 1 mass % to 7 mass %, and even more preferably 2 mass % to 5 mass %. When the content of ethylene is 0.1 mass % or more, a melting point lowering effect may be sufficiently obtained by copolymerization of ethylene, and sealing properties against the electrolyte may be further improved. When the content of ethylene is 10 mass % or less, the melting point may be prevented from being excessively lowered, and the occurrence of excessive sealing may be more sufficiently reduced or prevented. It should be noted that the content of ethylene can be calculated from the mixing ratio of monomers at the time of polymerization.

The melting point of the propylene-ethylene random copolymer (A) is preferably in the range of 120° C. to 145° C., and more preferably 125° C. to 140° C. When the melting point is 120° C. or more, the occurrence of excessive sealing may be more effectively reduced or prevented. When the melting point is 145° C. or less, sealing properties against the electrolyte may be further improved.

The weight average molecular weight of the propylene-ethylene random copolymer (A) is preferably appropriately adjusted so that the melting point will be within the ranges mentioned above, and is more preferably in the range of 10,000 to 500,000, and even more preferably 100,000 to 500,000.

The propylene-ethylene random copolymer (A) may be acid-modified. For example, it may be an acid-modified propylene-ethylene random copolymer obtained by graft-modifying maleic anhydride. Use of the acid-modified propylene-ethylene random copolymer can retain adhesion to the tab lead without the need of using a tab sealant.

Such propylene-ethylene random copolymers (A) may be used singly, or in combination of two or more.

In the resin composition for forming the innermost layer 16c, the content of the component (A) is preferably in the range of 60 mass % to 95 mass %, more preferably 60 mass % to 90 mass %, and even more preferably 60 mass % to 85 mass %, relative to the total solid content of the resin composition. The content of the component (A) being 60 mass % or more can further improve sealing properties against the electrolyte, due to the effect exerted by the use of this component (A). Moreover, the content of the component (A) being 60 mass % or more can prevent other components, for example, the component (B) from being excessively present. Therefore, deterioration in heat resistance of the innermost layer 16c is reduced or prevented, and the occurrence of excessive sealing is also reduced or prevented. The content of the component (A) being 95 mass % or less can lead to the content of other components, for example, the component (B) being 5 mass % or more. Therefore, the effect of improving degassing heat-sealing strength can be sufficiently exerted by the component (B).

(Polyolefin-Based Elastomer (B) Having Butene-1 as a Comonomer)

A polyolefin-based elastomer (B) having butene-1 as a comonomer contributes to improving sealing properties, including degassing heat-sealing strength, against the electrolyte, and also contributes to imparting impact resistance (function as an impact resistance modifier) to the packaging material.

The polyolefin-based elastomer (B) may have miscibility with the component (A) or may not have miscibility therewith; however, may preferably contain both a miscible polyolefin-based elastomer (B-1) having miscibility, and an immiscible polyolefin-based elastomer (B-2) not having miscibility. Having miscibility (miscible system) with the component (A) means that the polyolefin-based elastomer (B) is dispersed with a dispersed phase size of 1 nm or more and less than 500 nm in the propylene-ethylene random copolymer resin constituting the component (A). Not having miscibility (immiscible system) means that the polyolefin-based elastomer (B) is dispersed with a dispersed phase size of 500 nm or more and less than 20 μm in the propylene-ethylene random copolymer resin constituting the component (A).

The miscible polyolefin-based elastomer (B-1) may be, for example, propylene-butene-1 random copolymer.

The immiscible polyolefin-based elastomer (B-2) may be, for example, ethylene-butene-1 random copolymer.

The melting point of the polyolefin-based elastomer (B) is preferably 150° C. or less. From the perspective of reducing or preventing excessive sealing and blushing, and improving sealing properties against the electrolyte, the melting point is more preferably in the range of 60° C. to 120° C., and more preferably 65° C. to 90° C. The melting point being 150° C. or less can further improve sealing properties, particularly degassing heat-sealing strength, against the electrolyte. The melting point being 60° C. or more is advantageous from the perspective of reducing or preventing the occurrence of excessive sealing.

Such polyolefin elastomers (B) can be used singly or in combination of two or more.

In the resin composition for forming the innermost layer 16c, the content of the component (B) is preferably in the range of 5 mass % to 40 mass %, more preferably 10 mass % to 40 mass %, and even more preferably 15 mass % to 40 mass %, relative to the total solid content of the resin composition. The content of the component (B) being 5 mass % or more can more sufficiently achieve the effect of improving sealing properties, in particular degassing heat seal strength, against the electrolyte. The content of the component (B) being 40 mass % or less can further reduce or prevent deterioration in heat resistance of the innermost layer 16c and the occurrence of excessive sealing.

If the component (B) contains the miscible polyolefin-based elastomer (B-1) and the immiscible polyolefin-based elastomer (B-2), the content ratio of the two (miscible polyolefin-based elastomer (B-1)/immiscible polyolefin-based elastomer (B-2)) is preferably from 0.5 to 3, and more preferably from 1 to 2 in mass ratio. The content ratio being within the above ranges can improve blushing resistance and sealing properties against the electrolyte in a well-balanced manner.

The presence of butene-1 in the innermost layer 16c can be verified by use of FT-IR (Fourier transform infrared spectrophotometer). The content of butene-1 can be verified by creating a calibration curve of the permeability or absorbance of the characteristic absorption band of the components (A) and (B) by using the resin composition to which a known amount of an elastomer containing a known amount of butene-1 is added. Further, the content of butene-1 in each of the miscible polyolefin-based elastomer (B-1) and immiscible polyolefin-based elastomer (B-2) can also be verified by similarly conducting imaging in the characteristic absorption band of FT-IR, and conducting mapping by microscopic FT-IR (transmission method) in an absorption band caused by butene-1. Besides FT-IR, the presence and content of butene-1 can be verified by dissolving the innermost layer 16c with a solvent, and measuring the solution by NMR.

The resin composition for forming the innermost layer 16c may further contain components besides the components (A) and (B) mentioned above. As the components besides the components (A) and (B), for example, resins such as LDPE (low density polyethylene) may be added to the resin composition to improve take-up properties and processability. The content of other resin components to be added is preferably 10 mass % or less relative to the total solid content of the resin composition. Components other than resins include, for example, a slip agent, antiblocking agent, antioxidant, light stabilizer, flame retardant, and the like. The content of these components other than resins is preferably 5 mass % or less relative to the total solid content of the resin composition.

(Constitution and Characteristics of Sealant Layer 16 as a Whole)

The sealant layer 16 as a whole may preferably contain a propylene-ethylene random copolymer as a main component. The main component herein refers to a component that occupies 50 mass % or more of the material constituting the sealant layer 16.

The sealant layer 16 has a crystallization temperature peak in a temperature range of about 100° C. to 200° C. If the sealant layer 16 has more than one crystallization temperature peaks, it is preferable that at least one peak is within the temperature range of about 100° C. to about 120° C., and more preferable that all the crystallization temperature peaks are about 120° C. or less. Also, it is preferable that, of the crystallization temperature peaks of the sealant layer 16, at least one is in the temperature range of about 100° C. to about 120° C., and all are about 120° C. or less.

The crystallization temperature peaks of the sealant layer 16 can be calculated based on DSC (differential scanning calorimetry) in accordance with JIS K 7121.

Even when the resin around the sealed portion melts during heat sealing, the packaging material 10 provided with such a sealant layer 16 crystallizes promptly so that excessive sealing is unlikely to develop. Moreover, even when excessive sealing occurs, the sealant layer 16 crystallizes promptly, and therefore the excessively sealed portion is unlikely to be unevenly crystalized. Conventional sealant layers are in a molten state when the electrolyte foams during heat sealing and are damaged by the foaming. However, the sealant layer 16 of the present embodiment crystallizes before the electrolyte foams, because at least one crystallization temperature peak is within the temperature range of about 100° C. to about 120° C. Therefore, the sealant layer 16 is prevented from being damaged.

The crystallization temperature of the sealant layer 16 can be adjusted by adding a crystal nucleating agent. That is, the sealant layer 16 may contain a crystal nucleating agent. If the sealant layer 16 is composed of two or more layers as described above, at least one of the two or more layers may contain a crystal nucleating agent, and, in particular, the innermost layer 16c preferably contains a crystal nucleating agent.

The crystal nucleating agent may be a saccharide (sorbitol, nonitol, or the like), a phosphate ester, a metal salt of carboxylic acid, an inorganic compound, or the like.

The content of the crystal nucleating agent is preferably 0.005 mass % to 10 mass % relative to the mass of the resin composition constituting the sealant layer 16. The nucleating agent contained in the sealant layer 16 may be identified and quantified, if the agent is an organic material, by IR, GC, GCMS or the like after extraction with a solvent, and, if the agent is an inorganic material, by analyzing the residue component after combustion of the sealant layer 16.

This content of the crystal nucleating agent contributes to allowing at least one crystallization temperature of the sealant layer to be within the range of about 100° C. to about 120° C. Since spherulites are formed more uniformly, the effect of preventing excessive sealing is enhanced. Moreover, even when excessive sealing occurs, this content of the crystal nucleating agent allows prompt crystallization of the excessively sealed portion, and allows formation of much finer and uniform spherulites. Therefore, non-uniform crystallization is unlikely to develop.

Moreover, this content of the crystal nucleating agent in the resin composition constituting the sealant layer 16 contributes to allowing at least one crystallization temperature peak of the sealant layer to be within the range of about 100° C. to about 120° C., and can minimize damage due to the foaming of the electrolyte during heat sealing. Moreover, as the size of the spherulites decreases and becomes dense, the proportion of the amorphous part decreases, and swelling of the electrolyte is reduced or prevented.

As another method of adjusting the crystallization temperature of the sealant layer 16, a homopolymer may be added to the sealant layer 16. The homopolymer in this case generally tends to have a higher crystallization temperature than that of a copolymer. For example, homopolypropylene may be added to the sealant layer 16 that contains a propylene-ethylene random copolymer as a main component. The amount of addition is preferably in the range of 1 mass % to 10 mass % relative to the total amount of the resin composition of any one of the outermost, intermediate and innermost layers 16a, 16b and 16c which are targets of addition.

The thickness of the sealant layer 16 is not particularly limited, but specifically, for example, is preferably in the range of 5 μm to 100 μm, and may be in the range of 10 μm to 35 μm from the perspective of reducing the thickness of the package. Even when the sealant layer is this thin, the sealant layer 16 with the configuration described above can secure insulation properties.

As described above, a preferred embodiment of the power storage device packaging material of the present invention has been described in detail. However, the present invention should not be construed as being limited to such a specific embodiment, but may be variously modified and changed within the range of the spirit of the present invention recited in claims.

For example, FIG. 1 shows an example where the anticorrosion treatment layer 14 is formed on the sealant layer 16-side surface of the metal foil layer 13. However, the anticorrosion treatment layer 14 may be formed on the first adhesive layer 12-side surface of the metal foil layer 13, or may be formed on both surfaces of the metal foil layer 13. If the anticorrosion treatment layer 14 is formed on both surfaces of the metal foil layer 13, the configuration of the anticorrosion treatment layer 14 formed on the first adhesive layer 12-side surface of the of the metal foil layer 13 may be the same as or different from the configuration of the anticorrosion treatment layer 14 formed on the sealant layer 16-side surface of the metal foil layer 13.

FIG. 1 shows an example where the sealant layer 16 is laminated on the metal foil layer 13 using the adhesion of the outermost layer 16a. However, as in the power storage device packaging material 20 shown in FIG. 2, a metal foil layer 13 and a sealant layer 16A may be laminated using a second adhesive layer 17. In this case, the outermost layer 16a may be provided or may be omitted. The second adhesive layer 17 will be described below.

<Second Adhesive Layer 17>

The second adhesive layer 17 bonds the metal foil layer 13 on which the anticorrosion treatment layer 14 is formed, to the sealant layer 16A. A general-purpose adhesive may be used for the second adhesive layer 17 to bond the metal foil layer 13 to the sealant layer 16A.

If the corrosion inhibition treatment layer 14 has a layer containing at least one polymer selected from the group consisting of such a cationic polymer and an anionic polymer as set out above, the second adhesive layer 17 is preferably one that contains a compound reactive (which may be referred to hereinafter as reactive compound) with the polymer contained in the corrosion inhibition treatment layer 14.

For example, if the anticorrosion treatment layer 14 contains a cationic polymer, the second adhesive layer 17 may contain a compound having reactivity with the cationic polymer. If the anticorrosion treatment layer 14 contains an anionic polymer, the second adhesive layer 17 may contain a compound having reactivity with the anionic polymer. If the anticorrosion treatment layer 14 contains both a cationic polymer and an anionic polymer, the second adhesive layer 17 may contain a compound having reactivity with the cationic polymer and a compound having reactivity with the anionic polymer. However, the second adhesive layer 17 does not necessarily need to contain the two kinds of compounds, but may contain a compound having reactivity with both of the cationic polymer and the anionic polymer. The expression having reactivity refers to forming a covalent bond with a cationic polymer or an anionic polymer. The second adhesive layer 17 may further contain an acid-modified polyolefin resin.

The compound having reactivity with a cationic polymer includes at least one compound selected from the group consisting of a polyfunctional isocyanate compound, a glycidyl compound, a compound having a carboxy group, and a compound having an oxazoline group.

The polyfunctional isocyanate compound, the glycidyl compound, the compound having a carboxy group, or the compound having an oxazoline group may be a polyfunctional isocyanate compound, a glycidyl compound, a compound having a carboxy group, a compound having an oxazoline group, or the like mentioned above, as a crosslinking agent for converting the cationic polymer into a crosslinked structure. In particular, a polyfunctional isocyanate compound is preferable from the perspective of having high reactivity with a cationic polymer and being readily formed into a crosslinked structure.

The compound having reactivity with the anionic polymer may be at least one compound selected from the group consisting of a glycidyl compound, and a compound having an oxazoline group. The glycidyl compound or the compound having an oxazoline group may be a glycidyl compound, a compound having an oxazoline group, or the like, mentioned above, as a crosslinking agent for converting the cationic polymer into a crosslinked structure.

If the second adhesive layer 17 contains an acid-modified polyolefin resin, it is preferable that the reactive compound is also reactive with the acidic group in the acid-modified polyolefin resin (i.e., forms a covalent bond with the acidic group). Thus, adhesion to the anticorrosion treatment layer 14 is further enhanced. In addition, the acid-modified polyolefin resin is permitted to have a crosslinked structure to further improve solvent resistance of the packaging material 10.

The content of the reactive compound is preferably 1 to 10 equivalents relative to the acidic group in the acid-modified polyolefin resin. When the content is 1 or more equivalents, the reactive compound sufficiently reacts with the acidic group in the acid-modified polyolefin resin. When the content exceeds 10 equivalents, the crosslinkage with the acid-modified polyolefin resin becomes structurally deficient, and there is a concern that the physical properties, such as solvent resistance, described above will be deteriorated.

The acid-modified polyolefin resin is obtained by introducing an acidic group into a polyolefin resin. The acidic group may be a carboxy group, sulfonic acid group, or the like. The carboxy group is particularly preferable. The acid-modified polyolefin resin may be the same resin as one mentioned as an example of a modified polyolefin resin (a) used for the outermost layer 16a.

Various additives such as a flame retardant, slip agent, antiblocking agent, antioxidant, light stabilizer, tackifier, or the like may be added to the second adhesive layer 17.

The second adhesive layer 17 preferably has a thickness in the range of 3 µm to 50 µm, and more preferably 3 µm to 10 µm. The thickness of the second adhesive layer 17 being not less than the lower limit can easily achieve good adhesion. The thickness of the second adhesive layer 17 being not more than the upper limit can reduce the amount of moisture permeating from the packaging material 20-side end face.

The configuration of the power storage device packaging material 20 is the same as the power storage device packaging material 10 except for the second adhesive layer 17. It should be noted that the thickness of the sealant layer 16A of the power storage device packaging material 20 is adjusted according to the thickness of the second adhesive layer 17. The thickness of the sealant layer 16A of the power storage device packaging material 20 is not particularly limited, but may preferably be, for example, in the range of 5 µm to 100 µm, or may be in the range of 10 µm to 35 µm from the perspective of reducing the thickness of the package.

[Method for Producing Packaging Material]

Next, an example of a method of producing the packaging material 10 shown in FIG. 1 will be described. The method of producing the packaging material 10 is not limited to the following one.

The method of producing a packaging material 10 of the present embodiment generally includes the steps of stacking a corrosion inhibition treatment layer 14 on a metal foil layer 13, bonding a substrate layer 11 and the metal foil layer 13 together, further stacking a sealant layer 16 to provide a laminate, and thermally treating the thus obtained laminate, if necessary.

(Step of Laminating the Anticorrosion Treatment Layer 14 on the Metal Foil Layer 13)

In the present step, the anticorrosion treatment layer 14 is formed on the metal foil layer 13. As described above, the method may include applying a degreasing treatment, hydrothermal modification treatment, anodic oxidation treatment, or chemical conversion treatment to the metal foil layer 13, or applying a coating agent having a corrosion prevention performance onto the metal foil layer 13.

If the anticorrosion treatment layer 14 is a multilayer, for example, a coating liquid (coating agent) that serves as a lower layer-side (metal foil layer 13-side) anticorrosion treatment layer may be applied to the metal foil layer 13, followed by baking to form a first layer, and then, a coating liquid (coating agent) that serves as an upper layer-side anticorrosion treatment layer may be applied to the first layer, followed by baking to form a second layer. The second layer may be formed in a step of laminating the sealant layer 16 described later.

The degreasing treatment may be carried out by spraying or immersion. The hydrothermal modification treatment and the anodic oxidation treatment may be carried out by immersion. Chemical conversion treatment may be selected from among immersion, spraying and coating according to the type of chemical conversion treatment.

Various methods such as gravure coating, reverse coating, roll coating or bar coating may be used as the method of applying the coating agent having corrosion prevention performance.

As described above, the various treatments may be applied to either side or both sides of the metal foil. In the case of a single-side treatment, the treatment is preferably applied to the surface on which the sealant layer 16 is to be laminated. If needed, the treatment mentioned above may also be applied to the surface of the substrate layer 11.

The amounts of the coating agents for forming the first and second layers are preferably both in the range of 0.005 $g/m^2$ to 0.200 $g/m^2$, more preferably 0.010 $g/m^2$ to 0.100 $g/m^2$.

If necessary, dry curing may be carried out within a base material temperature range of 60° C. to 300° C. depending on the drying conditions of the corrosion inhibition treatment layer 14 used.

(Step of Bonding Substrate Layer 11 and Metal Foil Layer 13)

In the present step, the metal foil layer 13 provided with the corrosion preventing treatment layer 14 is bonded to the substrate layer 11 via the first adhesive layer 12. The bonding method uses a technique such as dry lamination, non-solvent lamination or wet lamination, and bonds the two layers using the material forming the aforementioned first adhesive layer 12. The adhesive layer 12 is provided in the range of 1 $g/m^2$ to 10 $g/m^2$, and more preferably in the range of 3 $g/m^2$ to 7 $g/m^2$ in terms of dry coating amount.

(Step of Laminating Sealant Layer 16)

In the present step, a sealant layer 16 is formed on the anticorrosion treatment layer 14 formed in the previous step. The method may be tandem lamination or coextrusion of extruding the outermost layer 16a, the intermediate layer 16b and the innermost layer 16c using an extrusion lamination machine. In this case, materials that are dry-blended so as to be the composition having the material formulation mentioned above, as a resin composition for forming a sealant layer, may be directly laminated using an extrusion laminator, or granules obtained in advance by melt-blending materials using a melt kneading device, such as a single-screw extruder, twin-screw extruder or Brabender mixer, may be laminated into the outermost layer 16a, the intermediate layer 16b and the innermost layer 16c through tandem lamination or coextrusion using an extrusion laminator.

According to the present step, there can be obtained a laminate, as shown in FIG. 1, where the substrate layer 11/the first adhesive layer 12/the metal foil layer 13/the anticorrosion treatment layer 14/the sealant layer 16 are laminated in this order.

In the case of forming an anticorrosion treatment layer 14 with a multilayer structure, if the extrusion laminator is provided with a unit that can apply an anchor coat layer, this unit may be used for applying a second layer of the anticorrosion treatment layer 14.

(Step of Heating)

In the present step, the laminate is heat-treated. Heat treatment of the laminate can improve adhesion between the metal foil layer 13/the anticorrosion treatment layer 14/the sealant layer 16, and can impart much better electrolyte resistance and hydrofluoric acid resistance to the laminate. Although the temperature of the heat treatment depends such as on the materials constituting the sealant layer 16, as a rule of thumb, the laminate may preferably be heat-treated so that the maximum temperature reached of the laminate will be higher by 20° C. to 100° C. than the melting point of the sealant layer 16, and more preferably higher by 20° C. to 60° C. than the melting point of the sealant layer 16. If the maximum temperature reached of the laminate is below this range, adhesion between the metal foil layer 13/the anticorrosion treatment layer 14/the sealant layer 16 may not be sufficient. If the maximum temperature reached of the laminate exceeds this range, for example, thermal expansion of the metal foil and thermal contraction of the substrate layer after bonding may develop, which may impair processability and other properties. Therefore, although the heat treatment time duration depends on the treatment temperature, the laminate is desirably heat-treated only for a short time (e.g., less than 30 seconds).

In this manner, there can be produced the packaging material 10 of the present embodiment as shown in FIG. 1.

Next, an example of a method of producing the packaging material 20 shown in FIG. 2 will be described. The method of producing the packaging material 20 is not limited to the following one.

The method of producing the packaging material 20 of the present embodiment includes a step of laminating the anticorrosion treatment layer 14 on the metal foil layer 13, a step of bonding the substrate layer 11 and the metal foil layer 13, a step of preparing a laminate by further laminating the sealant layer 16A via the second adhesive layer 17, and, if necessary, a step of aging the resultant laminate. Steps up to the step of bonding the substrate layer 11 and the metal foil layer 13 can be performed in the same manner as in the method of producing the packaging material 10.

(Step of Laminating Second Adhesive Layer 17 and Sealant Layer 16A)

In the present step, the sealant layer 16A is bonded to the anticorrosion treatment layer 14-side of the metal foil layer 13 via the second adhesive layer 17. The bonding method may be wet processing.

If wet processing is used, a solution or a dispersion of the adhesive forming the second adhesive layer 17 is applied onto the anticorrosion treatment layer 14 and the solvent is vaporized at a predetermined temperature (if the adhesive contains an acid-modified polyolefin resin, the temperature is not less than its melting point), followed by drying, which may be further followed by baking, if necessary, to thereby form a film. Then, the sealant layer 16A is laminated, thereby producing the packaging material 20. The coating method may be any of the various coating methods mentioned above.

The second adhesive layer 17 and the sealant layer 16A may be laminated by dry lamination of temporarily drying a solution of an adhesive that has been applied onto the anticorrosion treatment layer 14.

(Step of Aging)

In the present step, the laminate is aged (cured). Aging of the laminate can expedite adhesion between the metal foil layer 13/the anticorrosion treatment layer 14/the second adhesive layer 17/the sealant layer 16A. Aging may be conducted in the range of room temperature to 100° C. Aging time is, for example, 1 day to 10 days.

Figure 2:
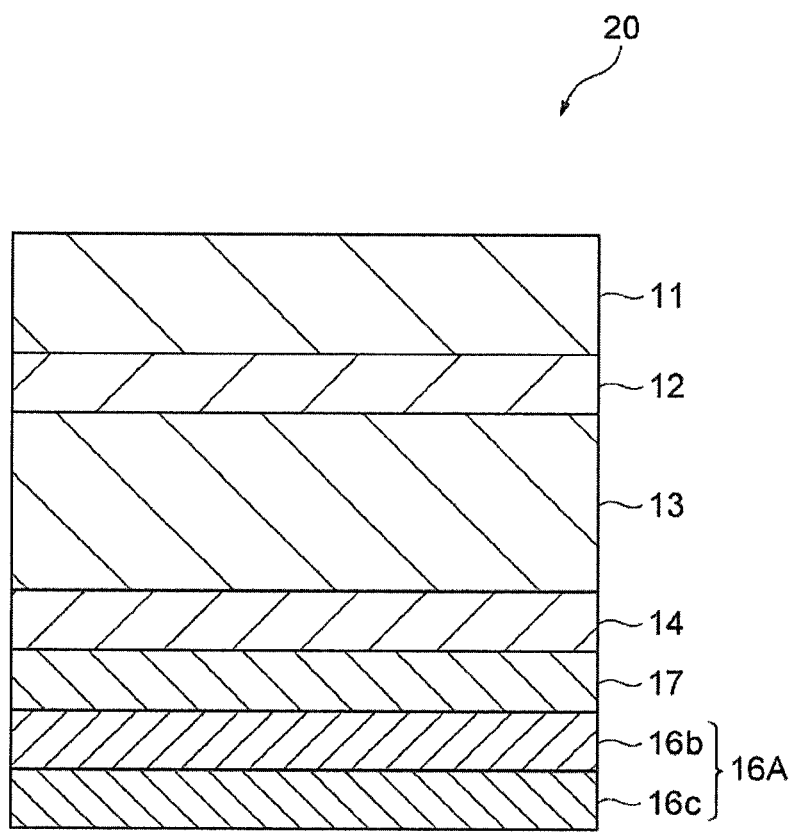
FIG. 2 is a schematic cross-sectional view illustrating a power storage device packaging material according to an embodiment of the present invention.

In this manner, the packaging material 20 of the present embodiment as shown in FIG. 2 can be produced.

Preferred embodiments of the power storage device packaging material and the production method of the present invention have been described in detail so far. The present invention should not be construed as being limited to such specific embodiments but may be variously modified and altered within the spirit of the present invention recited in the claims. When producing a power storage device packaging material including a coating layer instead of the substrate layer 11 and the first adhesive layer 12, the coating layer may be formed, as described above, by applying a resin material that will serve as the coating layer onto the metal foil layer 13.

The power storage device packaging material of the present invention can be conveniently used as a packaging material for power storage devices including, for example, secondary batteries such as a lithium ion battery, a nickel hydrogen battery and a lead storage battery, and electrochemical capacitors such as an electric double layer capacitor. In particular, the power storage device packaging material of the present invention is preferable as a packaging material for a lithium ion battery.

EXAMPLES

The present invention will be more specifically described below by way of examples and comparative examples. The present invention should not be limited to the following examples.

[Materials Used]

Materials used in examples and comparative example are set forth below.

<Substrate Layer (12-μm Thickness)>

Nylon film (Ny) (manufactured by Toyobo Co., Ltd.) was used.

<First Adhesive Layer (4-μm Thickness)>

A polyurethane adhesive (manufactured by Toyo Ink Co., Ltd.) was used, containing a polyester polyol-based main resin to which a tolylene diisocyanate adduct curing agent was added.

<First Anticorrosion Treatment Layer (Substrate Layer Side)>

(CL-1): A sodium polyphosphate stabilized cerium oxide sol was used after being adjusted to a solid content concentration of 10 mass % by using distilled water as a solvent. It should be noted that the sodium polyphosphate stabilized cerium oxide sol was obtained by formulating 10 parts by mass of Na salt of phosphoric acid per 100 parts by mass of cerium oxide. (CL-2): A composition comprising 90 mass % of polyallylamine (manufactured by Nitto Boseki Co., Ltd) and 10 mass % of polyglycerol polyglycidyl ether (manufactured by Nagase Chemtex Corp.) was used after being adjusted to a solid concentration of 5 mass % using distilled water as a solvent. (CL-3): A chemical conversion treatment agent was used, which was prepared by adjusting a water-soluble phenol resin (Sumitomo Bakelite Co., Ltd.) having a solid concentration of 1 mass %, so that the content of the chromium fluoride ($CrF_3$), as a Cr content, in the final dry coating film would be 10 mg/m$^2$, by using an aqueous phosphoric acid solution with a concentration of 1 mass % as a solvent.

<Metal Foil Layer (35-μm Thickness)>

Annealed and degreased soft aluminum foil (8079 Material manufactured by Toyo Aluminum K.K.) was used.

<Second Anticorrosion Treatment Layer (Sealant Layer Side)>

The same constitution as in the "first anticorrosion treatment layer (substrate layer side)" set forth above was adopted.

<Second Adhesive Layer (3-μm Thickness)>

The following adhesives A and B were prepared as adhesives for forming the second adhesive layer. (Adhesive A): An adhesive obtained by formulating 10 parts by mass (solid content ratio) of a polyisocyanate compound having an isocyanurate structure per 100 parts by mass of a maleic anhydride-modified polyolefin resin dissolved in toluene. (Adhesive B): A polyurethane adhesive prepared by formulating a polyester polyol comprising a hydrogenated dimer fatty acid and a diol, and a polyisocyanate at a molar ratio (NCO/OH) of 2.

<Sealant Layer>

The following materials were used singly or in the form of a mixture of two or more, as the outermost layer, the intermediate layer, and the innermost layer.

(AR-1): Random polypropylene (PP)-based acid-modified polypropylene resin composition (Admer manufactured by Mitsui Chemicals, Inc.) containing ethylene-propylene rubber as immiscible rubber.

(AR-2): A propylene-α-olefin copolymer having an atactic structure (Tafthren H manufactured by Sumitomo Chemical Co., Ltd.).

(Random PP): Propylene-ethylene random copolymer having a melting point of 140° C.

(Prime Polypro manufactured by Prime Polymer Co., Ltd.).

(Block PP): Block polypropylene (propylene-ethylene block copolymer)

(Homo PP): Homopropylene (polymer of propylene)

The following additives were added to the sealant layer as necessary.

(AD-1): Impact resistance modifier. A mixture of propylene-butene-1 random copolymer elastomer (TAFMER XM manufactured by Mitsui Chemicals, Inc.) having a melting point of 85° C. and miscible with random PP, and ethylene-butene-1 random copolymer elastomer (EXCELEN manufactured by Sumitomo Chemical Co., Ltd.) having a melting point of 75° C. and immiscible with random PP, with the weight ratio of the former compound to the latter compound being 2:1.

(AD-2): Impact resistance modifier. Styrene-based rubber.

(AD-3): Crystal nucleating agent. Nonitol-based compound.

Example 1

First, the first and second anticorrosion treatment layers were provided on the metal foil layer through the following procedure. That is, (CL-1) was applied to both surfaces of the metal foil layer by micro gravure coating at a dry coating weight of 70 mg/m$^2$, followed by baking at 200° C. in a drying unit. Next, (CL-2) was applied to the obtained layer by micro gravure coating at a dry coating weight of 20 mg/m$^2$, thereby forming a composite layer of (CL-1) and (CL-2) as first and second anticorrosion treatment layers. The composite layer developed corrosion prevention performance by using two compounds (CL-1) and (CL-2).

Next, the first anticorrosion treatment layer side of the metal foil layer provided with the first and second anticorrosion treatment layers was dry-laminated to a substrate layer using a polyurethane-based adhesive (first adhesive layer).

Separately, compounds of various materials for an outermost layer and an innermost layer for serving as the sealant layer were prepared using a biaxial extruder. Then, the compounds were water cooled and pelletized. The material used as the outermost layer was a composition of (AR-1):(AR-2)=3:1 (weight ratio), and the material used as the innermost layer was (homo PP).

Next, a sheet including the metal foil layer, the anticorrosion treatment layer, and the substrate layer mentioned above was loaded on an unwinding unit of an extrusion laminator, and the materials for the sealant layer were coextruded onto the second anticorrosion treatment layer under processing conditions of 290° C. and 100 m/min, thereby laminating a metal foil side layer (outermost layer) (having a thickness of 10 μm) and and an innermost layer (having a thickness of 20 μm) in this order as a sealant layer.

The laminate obtained in this way was heat-treated so that the maximum temperature reached of the laminate would be 190° C. to produce a packaging material of Example 1 (laminate of substrate layer/first adhesive layer/first anticorrosion treatment layer/metal foil layer/second anticorrosion treatment layer/outermost layer/innermost layer).

The sealant layer formed as described above had a crystallization temperature peak in the range of about 100° C. to about 120° C. and no crystallization temperature peak in the range exceeding about 120° C. The crystallization temperature herein was measured by DSC according to JIS K 7121.

Example 2

A packaging material was produced in the same manner as in Example 1 except that the material constituting the innermost layer was changed to (block PP).

Example 3

A packaging material was produced in the same manner as in Example 1 except that a composition with (random PP):(AD-1)=7:3 (weight ratio) was used as a material constituting the innermost layer, and that 10 mass % of (homo PP) was added to the innermost layer relative to the mass of the innermost layer.

Example 4

A packaging material was produced in the same manner as in Example 3 except that 10 mass % of (homo PP) was added to the outermost layer, not to the innermost layer, relative to the mass of the outermost layer.

Example 5

A packaging material was produced in the same manner as in Example 3 except that 10 mass % of (homo PP) was added to both the outermost layer and the innermost layer, relative to the masses of the respective layers.

Example 6

A packaging material was produced in the same manner as in Example 3 except that the thickness of the innermost layer was reduced to half (10 μm), and that a layer having the same constitution as that of the innermost layer was provided as an intermediate layer, and 10 mass % of (homo PP) was added to the intermediate layer, not to the innermost layer, relative to the mass of the intermediate layer.

Example 7

A packaging material was produced in the same manner as in Example 1 except that 0.005 mass % of (AD-3) was added to the innermost layer relative to the mass of the entire sealant layer. In this case, in the sealant layer as formed, crystallization temperature peaks were present not only in the range of about 100° C. to about 120° C., but also in the range exceeding about 120° C.

Example 8

A packaging material was produced in the same manner as in Example 7 except that a composition with (random PP):(AD-1)=7:3 (weight ratio) was used as a material constituting the innermost layer. In this case, the sealant layer as formed had a crystallization temperature peak in the range of about 100° C. to about 120° C., but not in the range exceeding about 120° C.

Example 9

A packaging material was produced in the same manner as in Example 8 except that the amount of addition of the crystal nucleating agent was changed to 0.05 mass %.

Example 10

A packaging material was produced in the same manner as in Example 8 except that the amount of addition of the crystal nucleating agent was changed to 0.5 mass %.

Example 11

A packaging material was produced in the same manner as in Example 8 except that the amount of addition of the crystal nucleating agent was changed to 1 mass %.

Example 12

A packaging material was produced in the same manner as in Example 8 except that the amount of addition of the crystal nucleating agent was changed to 5 mass %.

Example 13

A packaging material was produced in the same manner as in Example 8 except that the amount of addition of the crystal nucleating agent was changed to 10 mass %.

Example 14

A packaging material was produced in the same manner as in Example 10 except that the crystal nucleating agent was added to the outermost layer, not to the innermost layer.

Example 15

A packaging material was produced in the same manner as in Example 10 except that the crystal nucleating agent was added to both the innermost layer and the outermost layer.

Example 16

A packaging material was produced in the same manner as in Example 10 except that the thickness of the innermost layer was reduced to half (10 μm), and that a layer having the same constitution as that of the innermost layer was provided as an intermediate layer and the crystal nucleating agent was added to the intermediate layer, not to the innermost layer.

Example 17

A packaging material was produced in the same manner as in Example 10 except that a composition with (random PP):(AD-2)=7:3 (weight ratio) was used as a material constituting the innermost layer.

Example 18

A packaging material was produced in the same manner as in Example 10 except that (random PP) alone was used as a material constituting the innermost layer.

Example 19

A packaging material was produced in the same manner as in Example 8 except that the amount of addition of the crystal nucleating agent was changed to 0.001 mass %.

Example 20

A packaging material was produced in the same manner as in Example 8 except that the amount of addition of the crystal nucleating agent was changed to 20 mass %.

Example 21

A packaging material was produced in the same manner as in Example 10 except that (AR-1) alone was used as a material constituting the innermost layer.

Example 22

A packaging material was produced in the same manner as in Example 10 except that the combination of (CL-1) and (CL-2) as a means for forming the anticorrosion treatment layer was changed to a combination of (CL-3) and (CL-2). That is, when forming the anticorrosion treatment layer, (CL-3) was applied to both surfaces of the metal foil layer by micro gravure coating at a dry coating weight of 30 mg/m², followed by baking at 200° C. in a drying unit. Next, (CL-2) was applied to the obtained layer by micro gravure coating at a dry coating weight of 20 mg/m², thereby forming a composite layer of (CL-3) and (CL-2) as first and second anticorrosion treatment layers. The composite layer developed corrosion prevention performance by using two compounds (CL-3) and (CL-2).

Example 23

A packaging material was produced in the same manner as in Example 10 except that the combination of (CL-1) and (CL-2) as a means for forming the anticorrosion treatment layer was changed to (CL-3) alone. That is, when forming the anticorrosion treatment layer, (CL-3) was applied to both surfaces of the metal foil layer by micro gravure coating at a dry coating weight of 30 mg/m², followed by baking at 200° C. in a drying unit, thereby forming first and second anticorrosion treatment layers.

Example 24

A packaging material was produced in the same manner as in Example 10 except that a second adhesive layer was formed instead of the outermost layer. When forming the second adhesive layer, the first anticorrosion treatment layer side of the metal foil layer provided with the first and second anticorrosion treatment layers was dry-laminated to a substrate layer using a polyurethane-based adhesive (first adhesive layer). Next, the second anticorrosion treatment layer side of the metal foil layer provided with the first and second anticorrosion treatment layers was dry-laminated to a layer (having a thickness of 20 μm) prepared as the innermost layer of the sealant layer, using the adhesive A (second adhesive layer).

The laminate obtained in this way was aged at 40° C. for 4 days to produce a packaging material (laminate of substrate layer/first adhesive layer/first anticorrosion treatment layer/metal foil layer/second anticorrosion treatment layer/second adhesive layer/innermost layer).

Example 25

A packaging material was produced in the same manner as in Example 24 except that the material constituting the second adhesive layer was changed to the adhesive B.

Comparative Example 1

A packaging material was produced in the same manner as in Example 7 except that the amount of addition of the crystal nucleating agent was changed to 0.5 mass %. In this case, the sealant layer formed had no crystallization temperature peak in the range of about 100° C. to about 120° C., but had a crystallization temperature peak in the range exceeding about 120° C. (125° C.).

Comparative Example 2

A packaging material was produced in the same manner as in Example 1 except that a composition with (random PP):(AD-1)=7:3 (weight ratio) was used as a material constituting the innermost layer. In this case, the sealant layer formed had no crystallization temperature peak in the range of about 100° C. to about 120° C. (98° C.).

<Assessment>

The following assessment tests were conducted on the packaging materials obtained in the examples and comparative examples.

(Lamination Strength in Electrolyte)

An electrolyte prepared by adding 1M of $LiPF_6$ to a mixed solution of ethylene carbonate/diethyl carbonate/dimethyl carbonate=1/1/1 (mass ratio) was filled in a Teflon (registered trademark) vessel. Then, a sample of each packaging material cut to 15 mm×100 mm was placed in the vessel, and the vessel was sealed and stored at 85° C. for 24 hours. Then, after prewashing, lamination strength (T-peel strength) between the metal foil layer and the sealant layer or between the metal foil layer and the second adhesive layer was measured using a testing machine (manufactured by INSTRON). The test was conducted in accordance with JIS K6854 at 23° C. and in a 50% RH atmosphere at a peeling rate of 50 mm/min. Based on the results, assessments were given by the following criteria.

A: Lamination strength was more than 9 N/15 mm.
B: Lamination strength was 7 N/15 mm or more and 9 N/15 mm or less.
C: Lamination strength was 5 N/15 mm or more and less than 7 N/15 mm.
D: Lamination strength was less than 5 N/15 mm.

(Heat Sealing Strength Against Electrolyte)

Figure 3:
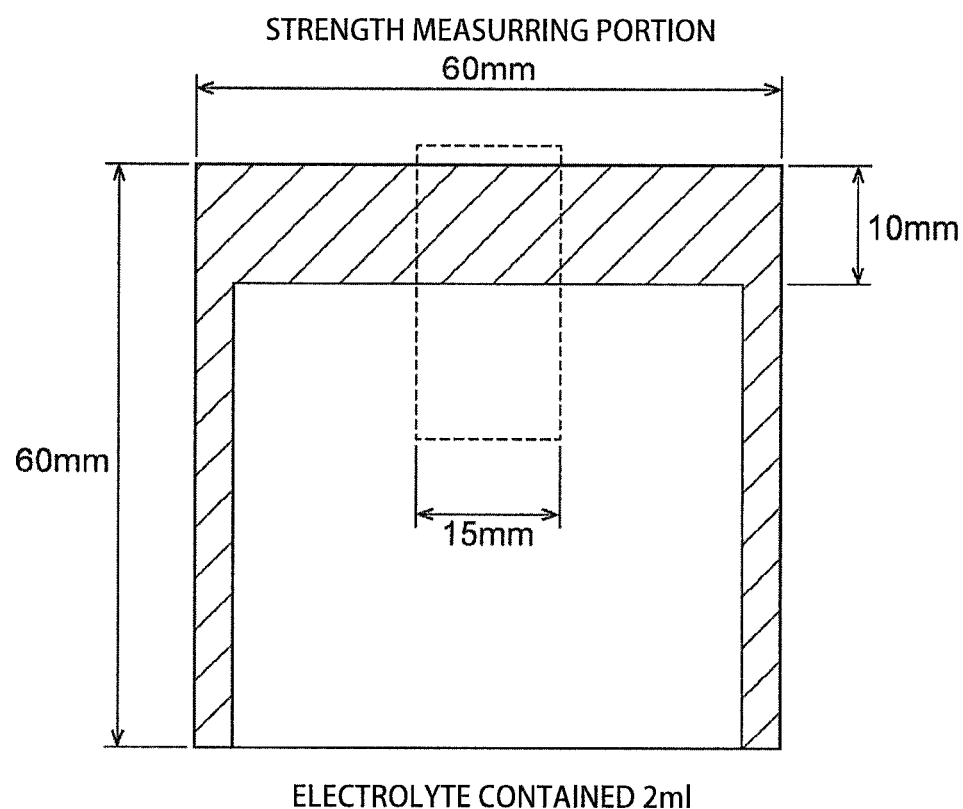
FIG. 3 is a schematic view illustrating a method of producing an assessment sample of examples.

A sample of the packaging material cut to 60 mm×120 mm was folded in half and heat-sealed at one side with a seal bar having a width of 10 mm at 190° C. and at 0.5 MPa, for 3 seconds. Then, the remaining two sides were heat-sealed so that the packaging material formed a pouch. An electrolyte was prepared by adding 1 M of $LiPF_6$ to a mixed solution of ethylene carbonate/diethyl carbonate/dimethyl carbonate with a mass ratio of 1:1:1. 2 ml of electrolyte was injected into the pouch and the pouch was stored at 60° C. for 24 hours. Then, the firstly heat-sealed side was cut to a 15-mm width (see FIG. 3) and the sealing strength (T-peel strength) was measured with a testing machine (manufactured by INSTRON). The test was conducted in accordance with JIS K6854 at 23° C. and in a 50% RH atmosphere at a peeling rate of 50 mm/min. Based on the results, assessments were given by the following criteria. A: Sealing strength was 80 N/15 mm or more and burst width was more than 5 mm. B: Sealing strength was 80 N/15 mm or more and burst width was 3 mm to 5 mm. C: Sealing strength was 60 N/15 mm or more and less than 80 N/15 mm. D: Sealing strength was less than 60 N/15 mm.

(Degassing Heat Seal Strength)

Figure 4A:
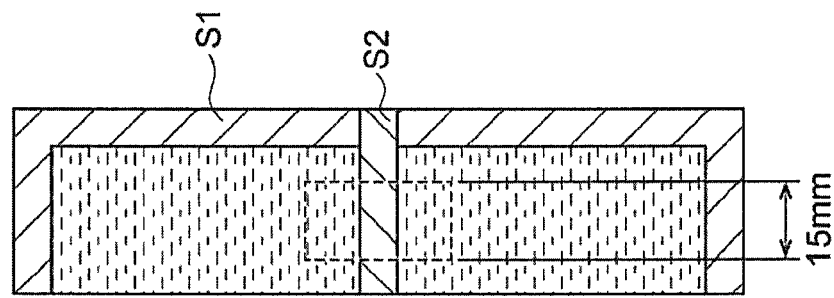
FIGS. 4A, 4B, and 4C are sets of schematic views illustrating a method of producing an assessment sample of examples. The abbreviation "TD" in FIG. 4A means "transverse direction."
Figure 4B:
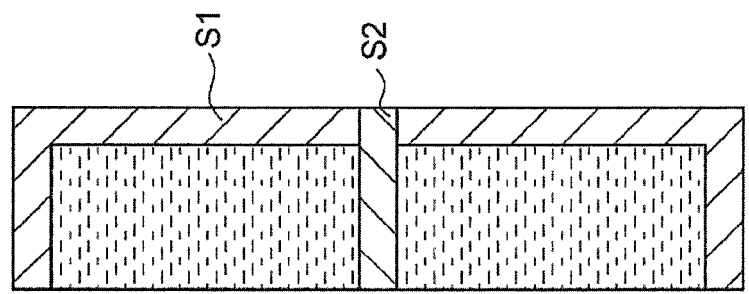
Figure 4C:
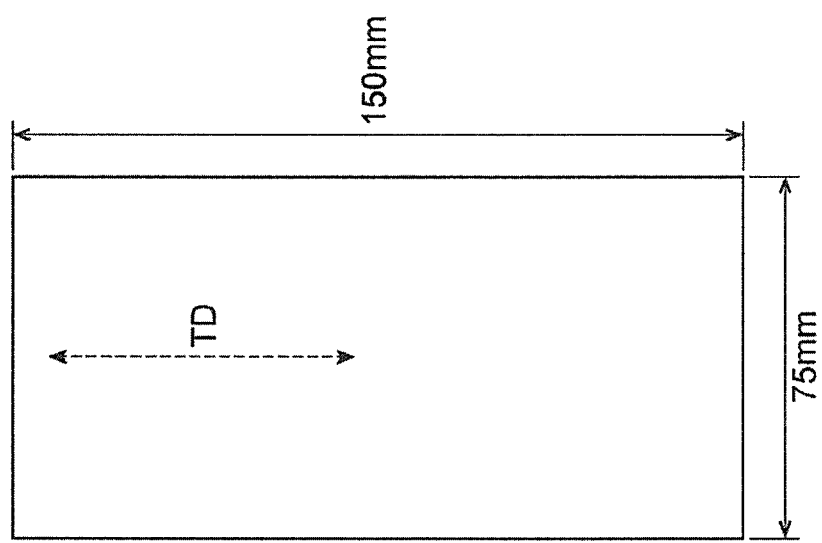

A sample of each packaging material cut to 75 mm×150 mm was folded in half to 37.5 mm×150 mm (see FIG. 4A). Then, the 150-mm side and one of the 37.5-mm sides were heat-sealed to form a pouch. Then, an electrolyte was prepared by adding 1 M of $LiPF_6$ to a mixed solution of ethylene carbonate/diethyl carbonate/dimethyl carbonate with a mass ratio of 1:1:1. 5 ml of electrolyte was injected into the pouch and the other 37.5 mm side was heat-sealed and a pouch sealed by a sealing portion S1 was obtained. Next, the pouch was stored at 60° C. for 24 hours, and then the center portion of the pouch containing the electrolyte was heat-sealed at 190° C. and at 0.3 MPa, for 2 seconds (degassing sealing portion S2, see FIG. 4B). To stabilize the sealing portion, the pouch was stored for 24 hours at room temperature. Then, a region including the degassing sealing portion S2 was cut to a 15-mm width (see FIG. 4C), and the heat-sealing strength (T-peel strength) was measured using a testing machine (manufactured by INSTRON). The test was conducted in accordance with JIS K6854 at 23° C. and in a 50% RH atmosphere at a peeling rate of 50 mm/min. Based on the results, assessments were given by the following criteria.

A: Sealing strength was 60 N/15 mm or more.
B: Sealing strength was 40 N/15 mm or more and less than 60 N/15 mm.
C: Sealing strength was 30 N/15 mm or more and less than 40 N/15 mm.
D: Sealing strength was less than 30 N/15 mm.

(Blushing after Forming)

A sample of each packaging material in a normal state and a sample of the same packaging material stored at 60° C. for one week were each cut to 120 mm×200 mm. Then, each of the cut samples was loaded on a cold forming die so that the sealant layer was in contact with the protrusion of the forming machine, followed by deep drawing of 2 mm at a forming rate of 5 mm/sec. Then, the side of the cut sample where stretching was the severest, due to the location near the film holding portion, was observed in terms of blushing. The die had a forming area of 80 mm×70 mm (square tube type) and a punch corner radius (RCP) of 1.0 mm. Based on the results, assessments were given by the following criteria. It can be said that there is no practical problem if the assessment is C or higher.
A: No blushing was observed in either of the normal state sample and the sample stored at 60° C. for 1 week.
B: No blushing was observed in the normal state sample, but slight blushing was observed in the sample stored at 60° C. for 1 week.
C: Slight blushing was observed in the normal state sample, and blushing was observed in the sample stored at 60° C. for 1 week.
D: Blushing was observed in the normal state sample.

(Insulation Properties after Forming)

Figure 5A:
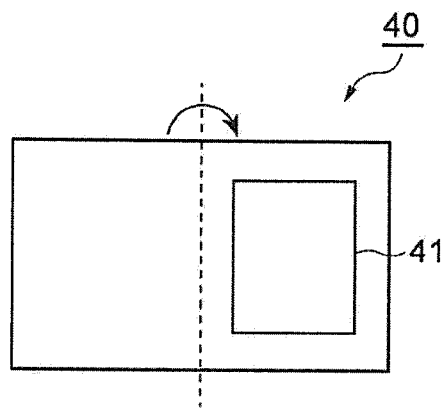
FIGS. 5A, 5B, 5C, 5D, 5E, and 5F are sets of schematic views illustrating a method of producing an assessment sample of examples.
Figure 5B:
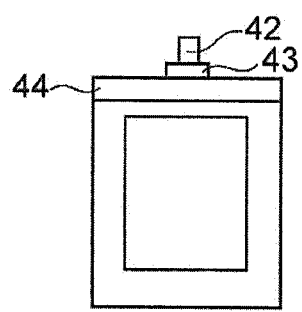
Figure 5C:
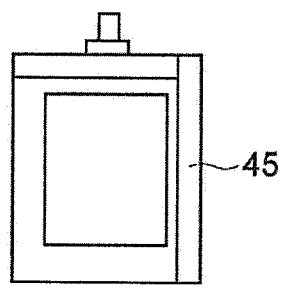
Figure 5D:
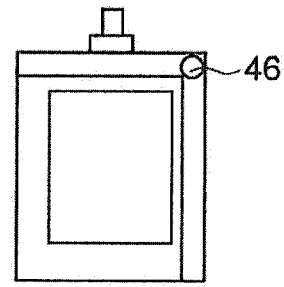
Figure 5E:
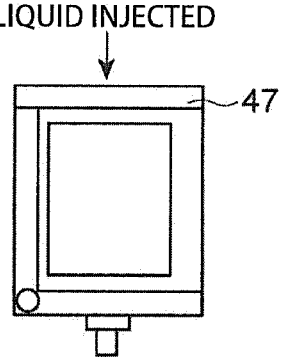
Figure 5F:
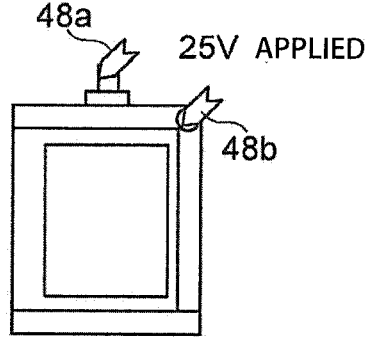

A sample 40 was prepared by cutting the packaging material to 120 mm×200 mm, and loaded on a cold forming die so that the sealant layer was in contact with the protrusion of the forming machine. Then, the sample 40 was deep-drawn to 2.0 mm at a forming rate of 15 mm/sec to form a deep-drawn portion 41. Then, the sample 40 was folded in half to 120 mm×100 mm (see FIG. 5A). Next, 100-mm upper edge portions 44, with a tab 42 and a tab sealant 43 sandwiched therebetween, were heat-sealed (see FIG. 5B). Then, 120-mm side edge portions 45 were heat-sealed to form a pouch (see FIG. 5C). Then, a portion of the outer layer of the sample 40 was scraped to form an exposed portion 46 for the metal foil layer so that electrodes could be brought into contact with the metal foil layer (see FIG. 5D). Then, 5 ml of an electrolyte prepared by adding 1 M of $LiPF_6$ to a mixed solution of ethylene carbonate/diethyl carbonate/dimethyl carbonate with a mass ratio of 1:1:1 was injected into the pouch, and 100-mm lower edge portions 47 were heat-sealed (see FIG. 5E). Then, after storing the pouch in an oven at 60° C. for 1 week, electrodes 48a and 48b were respectively connected to the tab 42 and the exposed portion 46 of the metal foil layer, followed by applying 25 V using a withstand voltage/insulation resistance testing machine (TOS 9201 manufactured by KIKUSUI), and the resistance then was measured (see FIG. 5F). The die had a forming area of 80 mm×70 mm (square tube type) and a punch corner radius (RCP) of 1.0 mm. Based on the results, assessments were given by the following criteria.
A: Resistance was more than 200 MΩ.
B: Resistance was 100 MΩ or more and 200 MΩ or less.
C: Resistance was 30 MΩ or more and less than 100 MΩ.
D: Resistance was less than 30 MΩ.

(Comprehensive Quality)

Tables 1 and 2 show layer constitutions of the Examples and Comparative Examples, and assessments thereof. In the tables, packaging materials with no D assessment can be regarded as having good overall quality.

TABLE 1

| | Anticorrosion treatment layer | Second adhesive layer | Sealant layer [Film thickness] | | | Additive [Added amount] | | |
|---|---|---|---|---|---|---|---|---|
| | | | Outermost layer | Intermediate layer | Innermost layer | Outermost layer | Intermediate layer | Innermost layer |
| Example 1 | (CL-1) + (CL-2) | — | (AR-1) + (AR-2) [10 μm] | — | Homo PP [20 μm] | — | — | — |
| Example 2 | (CL-1) + (CL-2) | — | (AR-1) + (AR-2) [10 μm] | — | Block PP [20 μm] | — | — | — |
| Example 3 | (CL-1) + (CL-2) | — | (AR-1) + (AR-2) [10 μm] | — | Random PP + (AD-1) [20 μm] | — | — | Homo PP [10 mass %] |
| Example 4 | (CL-1) + (CL-2) | — | (AR-1) + (AR-2) [10 μm] | — | Random PP + (AD-1) [20 μm] | Homo PP [10 mass %] | — | — |
| Example 5 | (CL-1) + (CL-2) | — | (AR-1) + (AR-2) [10 μm] | — | Random PP + (AD-1) [20 μm] | Homo PP [10 mass %] | — | Homo PP [10 mass %] |
| Example 6 | (CL-1) + (CL-2) | — | (AR-1) + (AR-2) [10 μm] | Random PP + (AD-1) [10 μm] | Random PP + (AD-1) [20 μm] | — | Homo PP [10 mass %] | — |
| Example 7 | (CL-1) + (CL-2) | — | (AR-1) + (AR-2) [10 μm] | — | Homo PP [20 μm] | — | — | Nucleating agent (0.005 mass %) |
| Example 8 | (CL-1) + (CL-2) | — | (AR-1) + (AR-2) [10 μm] | — | Random PP + (AD-1) [20 μm] | — | — | Nucleating agent (0.005 mass %) |
| Example 9 | (CL-1) + (CL-2) | — | (AR-1) + (AR-2) [10 μm] | — | Random PP + (AD-1) [20 μm] | — | — | Nucleating agent (0.05 mass %) |
| Example 10 | (CL-1) + (CL-2) | — | (AR-1) + (AR-2) [10 μm] | — | Random PP + (AD-1) [20 μm] | — | — | Nucleating agent (0.5 mass %) |
| Example 11 | (CL-1) + (CL-2) | — | (AR-1) + (AR-2) [10 μm] | — | Random PP + (AD-1) [20 μm] | — | — | Nucleating agent (1 mass %) |

TABLE 1-continued

| | | | | | | | | | |
|---|---|---|---|---|---|---|---|---|---|
| Example 12 | (CL-1) + (CL-2) | — | (AR-1) + (AR-2) [10 μm] | — | Random PP + (AD-1) [20 μm] | — | — | Nucleating agent (5 mass %) | |
| Example 13 | (CL-1) + (CL-2) | — | (AR-1) + (AR-2) [10 μm] | — | Random PP + (AD-1) [20 μm] | — | — | Nucleating agent (10 mass %) | |

| | Crystallization temperature | | Assessment | | | | |
|---|---|---|---|---|---|---|---|
| | peak in the range of 100° C. to 120° C. | Crystallization temperature peak above 120° C. | Lamination strength in electrolyte | Heat-sealing strength in electrolyte | Degassing heat-sealing strength | Blushing after forming | Insulation properties after forming |
| Example 1 | Present | Absent | B | C | C | C | B |
| Example 2 | Present | Absent | B | C | C | C | B |
| Example 3 | Present | Absent | A | B | B | B | A |
| Example 4 | Present | Absent | B | A | A | B | B |
| Example 5 | Present | Absent | B | B | B | B | A |
| Example 6 | Present | Absent | B | B | B | B | B |
| Example 7 | Present | Present | B | C | C | C | B |
| Example 8 | Present | Absent | A | A | A | A | B |
| Example 9 | Present | Absent | A | A | A | A | B |
| Example 10 | Present | Absent | A | A | A | A | A |
| Example 11 | Present | Absent | A | A | A | A | A |
| Example 12 | Present | Absent | A | A | B | A | A |
| Example 13 | Present | Absent | A | B | B | A | A |

TABLE 2

| | Anticorrosion treatment layer | Second adhesive layer | Sealant layer [Film thickness] | | | Additive [Added amount] | | |
|---|---|---|---|---|---|---|---|---|
| | | | Outermost layer | Intermediate layer | Innermost layer | Outermost layer | Intermediate layer | Innermost layer |
| Example 14 | (CL-1) + (CL-2) | — | (AR-1) + (AR-2) [10 μm] | — | Random PP + (AD-1) [20 μm] | Nucleating agent (0.5 mass %) | — | — |
| Example 15 | (CL-1) + (CL-2) | — | (AR-1) + (AR-2) [10 μm] | — | Random PP + (AD-1) [20 μm] | Nucleating agent (0.5 mass %) | — | Nucleating agent (0.5 mass %) |
| Example 16 | (CL-1) + (CL-2) | — | (AR-1) + (AR-2) [10 μm] | Random PP + (AD-1) [10 μm] | Random PP + (AD-1) [10 μm] | — | Nucleating agent (0.5 mass %) | — |
| Example 17 | (CL-1) + (CL-2) | — | (AR-1) + (AR-2) [10 μm] | — | Random PP + (AD-2) [20 μm] | — | — | Nucleating agent (0.5 mass %) |
| Example 18 | (CL-1) + (CL-2) | — | (AR-1) + (AR-2) [10 μm] | — | Random PP [20 μm] | — | — | Nucleating agent (0.5 mass %) |
| Example 19 | (CL-1) + (CL-2) | — | (AR-1) + (AR-2) [10 μm] | — | Random PP + (AD-1) [20 μm] | — | — | Nucleating agent (0.001 mass %) |
| Example 20 | (CL-1) + (CL-2) | — | (AR-1) + (AR-2) [10 μm] | — | Random PP + (AD-1) [20 μm] | — | — | Nucleating agent (20 mass %) |
| Example 21 | (CL-1) + (CL-2) | — | (AR-1) [10 μm] | — | Random PP + (AD-1) [20 μm] | — | — | Nucleating agent (0.5 mass %) |
| Example 22 | (CL-3) + (CL-2) | — | (AR-1) + (AR-2) [10 μm] | — | Random PP + (AD-1) [20 μm] | — | — | Nucleating agent (0.5 mass %) |
| Example 23 | (CL-3) | — | (AR-1) + (AR-2) [10 μm] | — | Random PP + (AD-1) [20 μm] | — | — | Nucleating agent (0.5 mass %) |
| Example 24 | (CL-1) + (CL-2) | Adhesive A | — | — | Random PP + (AD-1) [20 μm] | — | — | Nucleating agent (0.5 mass %) |
| Example 25 | (CL-1) + (CL-2) | Adhesive B | — | — | Random PP + (AD-1) [20 μm] | — | — | Nucleating agent (0.5 mass %) |
| Comparative Example 1 | (CL-1) + (CL-2) | — | (AR-1) + (AR-2) [10 μm] | — | Homo PP [20 μm] | — | — | Nucleating agent (0.5 mass %) |

TABLE 2-continued

| | | | | | | |
|---|---|---|---|---|---|---|
| Comparative Example 2 | (CL-1) + (CL-2) | — | (AR-1) + (AR-2) [10 μm] | — | Random PP + (AD-1) [20 μm] | — | — | — |

| | Crystallization | | Assessment | | | | |
|---|---|---|---|---|---|---|---|
| | temperature peak in the range of 100° C. to 120° C. | Crystallization temperature peak above 120° C. | Electrolyte lamination strength | Electrolyte heat-sealing strength | Degassing heat-sealing strength | Blushing after forming | Insulation properties after forming |
| Example 14 | Present | Absent | A | A | A | A | B |
| Example 15 | Present | Absent | A | A | A | A | A |
| Example 16 | Present | Absent | A | A | A | A | B |
| Example 17 | Present | Absent | B | C | C | A | A |
| Example 18 | Present | Absent | A | B | B | B | B |
| Example 19 | Present | Absent | A | A | A | A | C |
| Example 20 | Present | Absent | A | C | C | A | A |
| Example 21 | Present | Absent | B | B | B | A | A |
| Example 22 | Present | Absent | B | B | B | A | A |
| Example 23 | Present | Absent | C | B | B | A | A |
| Example 24 | Present | Absent | A | A | A | A | A |
| Example 25 | Present | Absent | C | B | B | A | A |
| Comparative Example 1 | Absent (125° C.) | Present | A | D | D | C | B |
| Comparative Example 2 | Absent (98° C.) | Absent | A | A | A | A | D |

As is evident from Tables 1 and 2, it was confirmed that the packaging materials of Examples 1 to 25 had good insulation properties after forming. It was also confirmed that the packaging materials of Examples 1 to 30 had good performance in terms of electrolyte lamination strength, electrolyte heat-sealing strength, degassing heat-sealing strength, and blushing. In contrast, it was confirmed that the packaging material of Comparative Example 1 exhibited poor electrolyte heat-sealing strength and degassing heat-sealing strength, while the packaging material of Comparative Example 2 exhibited poor insulation properties after forming.

INDUSTRIAL APPLICABILITY

The present invention is useful for a power storage device packaging material.

REFERENCE SIGNS LIST 10, 20 . . . power storage device packaging material; 11 . . . Substrate layer; 12 . . . First adhesive layer; 13 . . . Metal foil layer; 14 . . . Anticorrosion treatment layer; 16, 16A . . . Sealant layer; 16a . . . Outermost layer; 16b . . . Intermediate layer; 16c . . . Innermost layer; 17 . . . Second adhesive layer; 40 . . . Sample; 41 . . . Deep-drawn portion; 42 . . . Tab; 43 . . . Tab sealant; 44 . . . Upper edge portion; 45 . . . Side edge portion; 46 . . . Exposed portion of metal foil layer; 47 . . . Lower edge portion; 48a, 48b . . . Electrodes; S1 . . . Sealing portion; S2 . . . Degassing sealing portion.

What is claimed is:

1. A power storage device packaging material, comprising:
a laminate comprising:
a substrate layer,
a metal foil layer,
a first adhesive layer between the substrate layer and the metal foil layer,
an anticorrosion treatment layer on a surface of the metal foil layer, which is opposite to a surface of the metal foil layer facing the substrate layer;
a sealant layer and
a second adhesive layer directly between the anticorrosion treatment layer and the sealant layer;
wherein the sealant layer comprises two or more layers, and a layer closest to the metal foil layer among the two or more layers comprises an acid-modified polypropylene, and either a polypropylene having an atactic structure or a propylene-α-olefin copolymer having an atactic structure; and a layer farthest from the metal foil layer among the two or more layers of the sealant layer is made of a resin composition containing 50 mass % or more of propylene-ethylene random copolymer and 0.005 mass % to 10 mass % of a crystal nucleating agent relative to a mass of the resin composition so that the sealant layer has at least one crystallization temperature peak in a temperature range of about 100° C. to about 120° C.

2. The power storage device packaging material of claim 1, wherein the sealant layer has multiple crystallization peaks and all of the multiple crystallization temperature peaks of the sealant layer are about 120° C. or less.

3. The power storage device packaging material of claim 1, wherein a layer farthest from the metal foil layer among the two or more layers of the sealant layer contains 60 mass % to 85 mass % of the propylene-ethylene random copolymer.

4. The power storage device packaging material of claim 3, wherein the sealant layer contains an impact resistance modifier.

5. The power storage device packaging material of claim 4, wherein the impact resistance modifier contains a propylene-butene-1 random copolymer which is an elastomer miscible with the propylene-ethylene random copolymer, and an ethylene-butene-1 random copolymer which is an elastomer immiscible with the propylene-ethylene random copolymer.

6. The power storage device packaging material of claim 5, wherein the sealant layer has no crystallization temperature peak above 120° C.

7. The power storage device packaging material of claim 6, wherein an ethylene content in the propylene-ethylene random copolymer is 2 mass % to 5 mass %.

8. The power storage device packaging material of claim 5, wherein the sealant layer has multiple crystallization peaks and all of the multiple crystallization temperature peaks of the sealant layer are about 120° C. or less.

9. The power storage device packaging material of claim 1, wherein:
   the second adhesive layer contains an acid-modified polyolefin, and at least one curing agent selected from the group consisting of a polyfunctional isocyanate compound, a glycidyl compound, a compound having a carboxy group, and a compound having an oxazoline group.

10. The power storage device packaging material of claim 1, wherein the anticorrosion treatment layer contains a cerium oxide, 1 part by mass to 100 parts by mass of phosphoric acid or phosphate relative to 100 parts by mass of the cerium oxide, and a cationic polymer.

11. The power storage device packaging material of claim 1, wherein the anticorrosion treatment layer is formed by subjecting the metal foil layer to a chemical conversion treatment, or the anticorrosion treatment layer is formed by subjecting the metal foil layer to a chemical conversion treatment and contains a cationic polymer.

12. The power storage device packaging material of claim 1, wherein the sealant layer has no crystallization temperature peak above 120° C.

13. The power storage device packaging material of claim 12, wherein an ethylene content in the propylene-ethylene random copolymer is 2 mass % to 5 mass %.

14. The power storage device packaging material of claim 1, wherein an ethylene content in the propylene-ethylene random copolymer is 2 mass % to 5 mass %.

\* \* \* \* \*